(12) United States Patent
Sakamoto et al.

(10) Patent No.: US 7,558,180 B2
(45) Date of Patent: Jul. 7, 2009

(54) LIGHT SOURCE APPARATUS PROVIDED WITH BEAM SHAPING ELEMENT AND OPTICAL PICK-UP APPARATUS HAVING THE SAME

(75) Inventors: Katsuya Sakamoto, Saitama (JP); Junji Hashimura, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 796 days.

(21) Appl. No.: 10/532,602

(22) PCT Filed: Aug. 10, 2004

(86) PCT No.: PCT/JP2004/011729

§ 371 (c)(1),
(2), (4) Date: Apr. 25, 2005

(87) PCT Pub. No.: WO2005/020220

PCT Pub. Date: Mar. 3, 2005

(65) Prior Publication Data

US 2006/0120251 A1    Jun. 8, 2006

(30) Foreign Application Priority Data

Aug. 22, 2003 (JP) ............................. 2003-299300
Feb. 13, 2004 (JP) ............................. 2004-036861

(51) Int. Cl.
*G11B 7/135* (2006.01)

(52) U.S. Cl. ................................................. 369/112.23
(58) Field of Classification Search ....................... None
See application file for complete search history.

(56) References Cited

U.S. PATENT DOCUMENTS

| 5,420,952 A * | 5/1995 | Katsura et al. ................. 385/80 |
| 2002/0166952 A1 * | 11/2002 | Tanaka et al. ................ 250/216 |
| 2006/0103907 A1 * | 5/2006 | Hatade et al. ................ 359/207 |

FOREIGN PATENT DOCUMENTS

| JP | 2002-123960 A | 4/2002 |
| JP | 2002-287018 A | 10/2002 |
| JP | 2002-323673 A | 11/2002 |
| JP | 2004-71071 A | 3/2004 |

OTHER PUBLICATIONS

International Search Report dated Dec. 2, 2004.

* cited by examiner

*Primary Examiner*—Jorge L Ortiz Criado
*Assistant Examiner*—Nathan Danielsen
(74) *Attorney, Agent, or Firm*—Finnegan, Henderson, Farabow, Garrett & Dunner, L.L.P.

(57) ABSTRACT

The present invention has a beam shaping element for converting the light source 11 into a light flux whose emitting angle is almost equal and for projecting it, and a generation amount of the astigmatism generated by the temperature change is suppressed by a linear expansion of the beam shaping element.

16 Claims, 5 Drawing Sheets

FIG. 5(a)
FIG. 5(b)
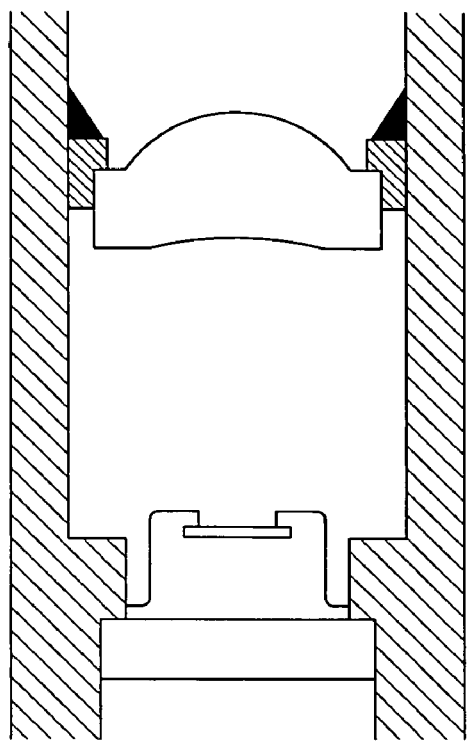
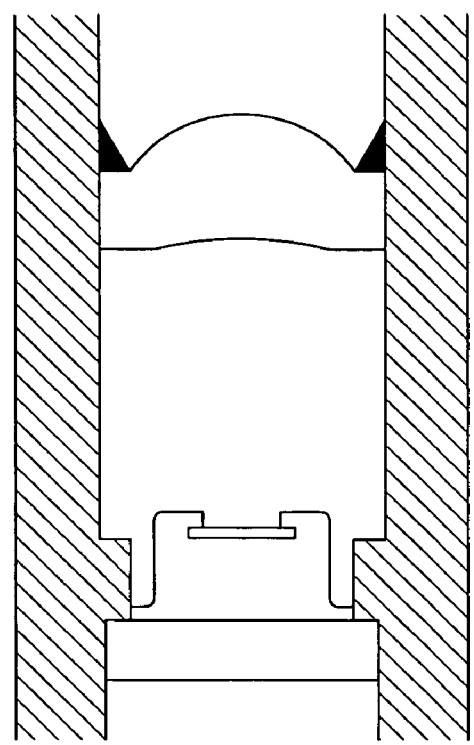

LIGHT SOURCE APPARATUS PROVIDED WITH BEAM SHAPING ELEMENT AND OPTICAL PICK-UP APPARATUS HAVING THE SAME

FIELD OF THE INVENTION

The present invention relates to a light source apparatus and an optical pick-up apparatus, which are provided with a beam shaping element.

BACKGROUND OF THE INVENTION

Generally, for the optical pick-up apparatus, a semiconductor laser such as LD (laser diode) is used as the light source. Because a diverging light flux projected from the semiconductor laser has an elliptical cross sectional shape (that is, a distribution of the light emitting strength is elliptical), it is necessary that the elliptical light flux from the semiconductor laser is converted to a circular light flux and a light utilization efficiency is increased.

As a beam shaping element (beam-shaper) to shape the sectional shape of the light flux from an elliptic to a circle, an optical element whose optical surface is an anamorphic surface or cylindrial surface, is well known. (For example, refer to Patent Documents 1 and 2).

(Patent Document 1) Tokkai No. 2003-178480
(Patent Document 2) Tokkai No. 2003-188452
(Patent Document 3) Tokkai No. 2002-323673

Recently, there are many cases where, in the optical pick-up apparatus, a light flux of short wavelength or a light flux of a large power is used. Therefore, there is a problem that a change of environmental temperature brings a change of performance (refractive index or shape) of an optical element composing an optical system or a change of a wavelength of a projected light flux from the semiconductor laser, and the astigmatism is generated. Accordingly, in order to suppress the change of the lens characteristic following a change of such a environmental temperature, generally, there are many cases where the optical element made of glass is used, and the optical element made of glass is adopted also for the beam-shaper disclosed in the Patent Documents 1 and 2. On the one hand, in the Patent Document 3, it is written that the beam-shaper made of plastic whose aberration change is small, is used.

When plastic is used, the performance change due to the temperature change is larger than glass. Also in Patent Document 3, a problem that the astigmatism is generated due to the temperature change by using the plastic shaping element is written, and it is written that the astigmatism is suppressed by the linear expansion of the plastic-made lens barrel provided between the light source and the beam-shaper.

However, in a method of the Document 3, because the linear expansion of the lens barrel provided between the light source and the beam-shaper is used for the astigmatism suppression, it is necessary to pay consideration for the selection of the material constituting the lens barrel for appropriately suppressing the astigmatism, or there are many limitations to the design work also for the thickness of the lens barrel itself or the length, and as a whole, there is a problem that the degree of freedom of the manufacture becomes narrow. Accordingly, specially, even when the element made of plastic is used, a result is brought about in which a merit of low cost•small size•light weight can not be fully exhibited.

Furthermore, in the case of the beam-shaper of the Document 3, because both of an incident surface and an outgoing surface are composed of a toric surface, the surface shape becomes complicated, as a result, a low cost element, apparatus can not be realized.

An object of the present invention considers the above problems and is to provide a beam-shaper, light source apparatus, and optical pick-up apparatus, which are excellent in a point of low cost, small size, light weight, by which, while various aberrations including the generation of the astigmatism following the change of environmental temperature are effectively suppressed, the divergent light flux whose sectional shape is almost circular, can be projected.

SUMMARY OF THE INVENTION

The object of the present invention is to solve the above problems. In order to solve the above problems, the present invention is characterized in that: it has, as the first structure, a light source which projects the light flux whose emission angle is different in the horizontal direction and in the vertical direction, and a beam-shaper of a single lens formed of plastic for converting the light flux into the light flux whose emission angle is almost equal, and for projecting it, whose linear expansion coefficient $\alpha_n$ satisfies the following conditional expression (1), $$5.0 \times 10^{-5} < \alpha_n < 8.0 \times 10^{-5} \tag{1}$$

and a part of the beam-shaper is a light source apparatus fixed to the light source so that the astigmatism generated following the refractive index change of the beam-shaper generated due to the temperature change is suppressed by the interval change between the light source and the incident surface of the beam-shaper, which is generated by the linear expansion of the beam-shaper.

Further, as the second structure, the present invention is characterized in that: the beam-shaper is fixed so that the outgoing surface is not practically changed in the optical axis direction to the light source.

Further, as the third structure, it is characterized in that: the beam-shaper is structured in such a manner that it suppresses the astigmatism generated due to the temperature change by using the astigmatism generated following the shape change due to the temperature change of the beam-shaper.

Further, as the fourth structure, it is characterized in that: a fixing member to fix the beam-shaper outgoing surface is made of a material whose linear expansion coefficient satisfies $1.0 \times 10^{-5} < \alpha_n < 3.0 \times 10^{-5}$. Further, as the fifth structure, in the incident surface and outgoing surface of the beam-shaper, the sectional shape of the horizontal direction or vertical direction of at least one optical surface is non-circular arc.

Further, as the sixth structure, it is characterized in that: the surface shape of the beam-shaper incident surface satisfies the following Math-1 or Math-2.

$$(Z - R_x)^2 + X^2 = \left( R_x - \frac{Y^2}{R_y(1 + \sqrt{1 - (1 + k_y)Y^2/R_y^2})} + \sum_i A_{yi} Y^i \right)^2 \quad \text{[Math-1]}$$

$$(Z - R_y)^2 + Y^2 = \left( R_y - \frac{X^2}{R_x(1 + \sqrt{1 - (1 + k_x)X^2/R_x^2})} + \sum_i A_{xi} X^i \right)^2 \quad \text{[Math-2]}$$

Hereupon, herein, Z is a distance in the optical axis direction (Z-axis direction) (an advancing direction of the light is positive), X, Y are distances in X-axis direction (horizontal direction), Y-axis direction (vertical direction) (height from the optical axis), $R_x$ is a paraxial radius of curvature on XZ surface, $R_y$ is a paraxial radius of curvature on YZ surface, $k_x$, $k_y$, $A_{xi}$ and $A_{yi}$ are non-circular arc coefficients.

Further, as the seventh structure, it is characterized in that: the surface shape of the beam-shaper outgoing surface satisfies the following Math-3 or Math-4.

$$(Z-R_x)^2 + X^2 = \left(R_x - \frac{Y^2}{\left(1+\sqrt{1-Y^2/R_y^2}\right)}\right) \quad [\text{Math-3}]$$

$$(Z-R_y)^2 + Y^2 = \left(R_y - \frac{X^2}{\left(1+\sqrt{1-X^2/R_x^2}\right)}\right) \quad [\text{Math-4}]$$

Further, as the eighth structure, it is characterized in that: the surface shape of the beam-shaper outgoing surface satisfies the following Math-1 or math-2.

$$(Z-R_x)^2 + X^2 = \quad [\text{Math-1}]$$
$$\left(R_x - \frac{Y^2}{R_y\left(1+\sqrt{1-(1+k_y)Y^2/R_y^2}\right)} + \sum_i A_{yi} Y^i\right)^2$$

$$(Z-R_y)^2 + Y^2 = \quad [\text{Math-2}]$$
$$\left(R_y - \frac{X^2}{R_x\left(1+\sqrt{1-(1+k_x)X^2/R_x^2}\right)} + \sum_i A_{xi} X^i\right)$$

Hereupon, herein, Z is a distance in the optical axis direction (Z-axis direction) (an advancing direction of the light is positive), X, Y are distances in X-axis direction (horizontal direction), Y-axis direction (vertical direction) (height from the optical axis), $R_x$ is a paraxial radius of curvature on XZ surface, $R_y$ is a paraxial radius of curvature on YZ surface, $k_x$, $k_y$, $A_{xi}$ and $A_{yi}$ are non-circular arc coefficients.

Further, as the ninth structure, it is characterized in that: the surface shape of the beam-shaper incident surface is a shape which satisfies the following Math-3 or Math-4.

$$(Z-R_x)^2 + X^2 = \left(R_x - \frac{Y^2}{\left(1+\sqrt{1-Y^2/R_y^2}\right)}\right) \quad [\text{Math-3}]$$

$$(Z-R_y)^2 + Y^2 = \left(R_y - \frac{X^2}{\left(1+\sqrt{1-X^2/R_x^2}\right)}\right) \quad [\text{Math-4}]$$

Further, as the tenth structure, it is characterized in that: it has the light source apparatus and a light converging element for light-converging the light flux on the information recording surface of the optical information recording medium, and provides the optical pick-up apparatus for conducting the reproducing and/or recording of the information on the optical information recording medium.

Further, as the 11-th structure, it is characterized in that: the optical pick-up apparatus has a light flux conversion element for converting the light flux projected from the beam-shaper outgoing surface, and is structured so as to satisfy the following relational expression, $$0.5 < (L/S) \times fc < 1.0.$$

Hereupon, herein, L is the thickness (mm) on the axis of the beam-shaper, S is a distance (mm) on the optical axis between the light source and the beam-shaper incident surface, and fc is a focal distance (mm) of the light flux conversion element.

According to Table 1(a) and Table 8(a), in the lower limit of the above expression, the astigmatism generated by the change of the refractive index due to the temperature change is changed when the thickness on the axis and the interval between the light source and the beam-shaper are changed by the temperature change, however, an amount of the changed astigmatism is small, and the astigmatism remains. Further, in the upper limit of the above expression, the astigmatism generated by the change of the refractive index due to the temperature change is changed when the thickness on the axis and the interval between the light source and the beam-shaper are changed by the temperature change, however, an amount of the changed astigmatism is excessive, and the astigmatism also remains. Therefore, when the range of the above expression is applied, the astigmatism generated at the time of the temperature change can be appropriately suppressed.

Further, as the 12-th structure, it is characterized in that: the divergent angle conversion element is a coupling lens to convert the light flux projected from the beam-shaper into the parallel light parallel to the optical axis. Herein, the linear expansion coefficient $\alpha_n$ indicates an average linear expansion coefficient in the normal temperature range (about $-30°$ C.-$70°$ C.).

Further, "the astigmatism is suppressed" means not only that the astigmatism is made zero, but it is also included that the astigmatism is suppressed to the degree in which, actually, it does not influence on the recording or reproducing of the information.

Further, "the position in the optical axis direction is not relatively and practically changed to the light source" means that the distance in the optical axis direction to the light source is almost constant in the range of change of the environmental temperature.

According to the structure of the present invention, because the generation of the astigmatism following the change of the environmental temperature is suppressed by the astigmatism generated when the beam-shaper itself made of plastic is linear-expanded, and the interval between the light source and the element incident surface is changed, the degree of freedom of the material of the member to which the beam-shaper is attached or dimensions is spread. Further, when a fixing member for fixing the beam-shaper is structured by a material whose linear expansion coefficient satisfies $1.0 \times 10^{-5} < \alpha_n < 3.0 \times 10^{-5}$, as a whole of the light source apparatus, and optical pick-up apparatus, a low cost, small size, light weight apparatus can be provided.

Further, when the incident surface or outgoing surface as the optical surface of the beam-shaper is structured by the surface regulated by Math-1 or Math-2, as compared to a case where the optical surface of the beam-shaper is structured by a cylindrical surface, not only the astigmatism at the time of temperature change, but the suppression of the remained aberration (4thAS (tetraphyllous aberration)) also becomes possible, and the better optical characteristic can be obtained.

Further, when the outgoing surface in addition to the incident surface regulated by the above equation is structured by the surface regulated by Math-3 or Math-4, the better optical characteristic can be obtained.

Further, inversely, when the outgoing surface is structured by the surface regulated by Math-1 or Math-2, further, also when the incident surface is structured by the surface regulated by Math-3 or Math-4, in the same manner, the better optical characteristic can be obtained.

Further, when both of the incident surface and outgoing surface of the beam-shaper are structured by surfaces regulated by Math-1 or Math-2, as compared to a case where the optical surface of the beam-shaper is structured by a cylindrical surface, not only the astigmatism at the time of temperature change, but the suppression of the remained aberration (4thAS (tetraphyllous aberration)) also becomes possible, and the better optical characteristic can be obtained.

BRIEF DESCRIPTION OF THE DRAWINGS

FIG. 5(a), FIG. 5(b) are plan views showing a fixed example of the beam-shaper in the optical pick-up apparatus.

DETAILED DESCRIPTION OF THE INVENTION

Figure 1:
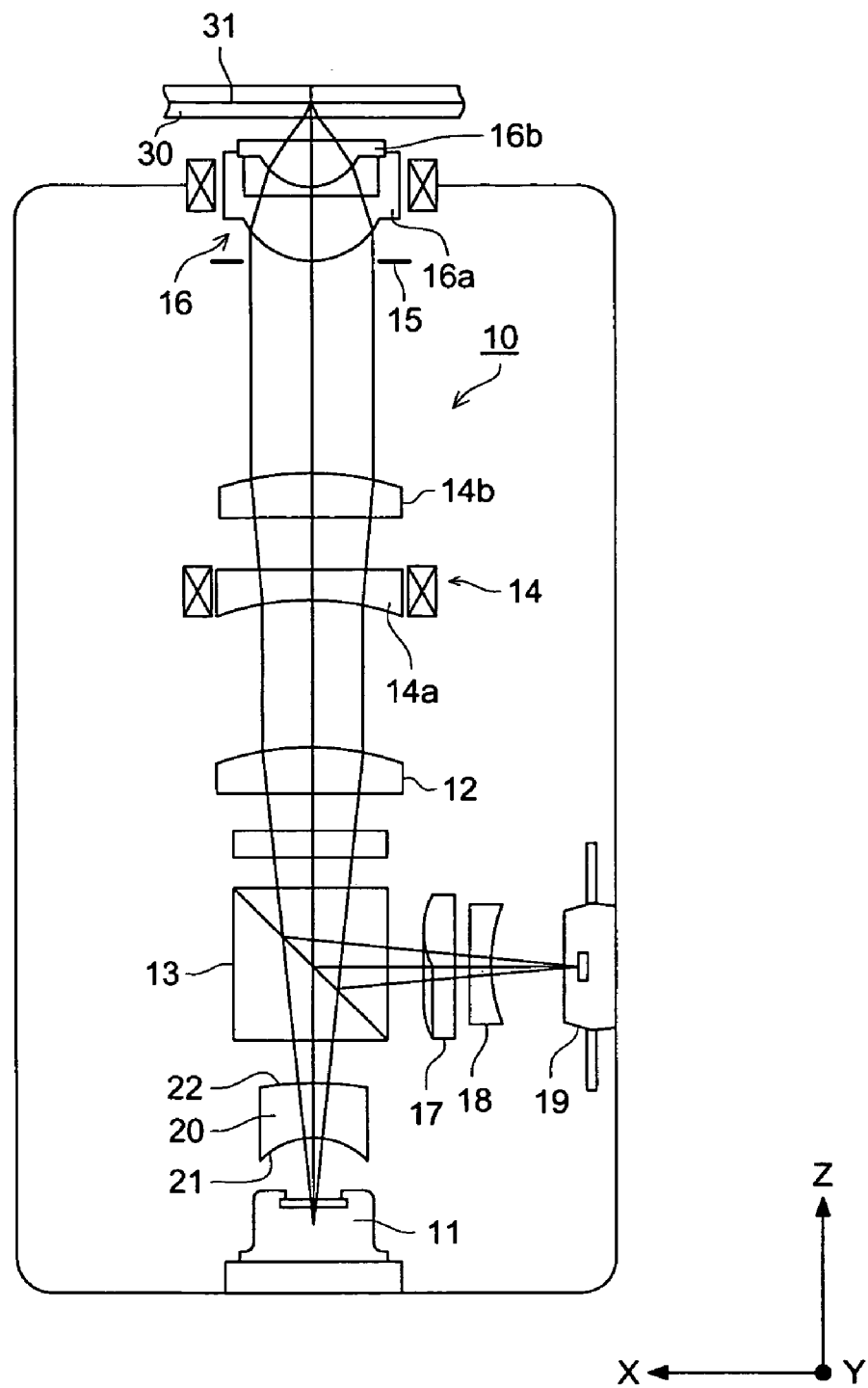
FIG. 1 is a plan view showing a structure of an optical pick-up apparatus.

Referring to the drawings, an embodiment to carry out the present invention will be detailed below.

In the present embodiment, as shown in FIG. 1, a beam shaping element 20 (hereinafter, called also a beam-shaper) according to the present invention is applied for an optical pick-up apparatus 10 by which the recording and/or reading of the information is conducted on an information recording surface 31 of an information recording medium by using a laser light (light flux) of a specific wavelength.

The optical pick-up apparatus 10 is generally structured by a laser oscillator 11(light source), beam-shaper 20, coupling lens 12, beam splitter 13, beam expander 14 (the first beam expander 14a and the second beam expander 14b), stop 15, objective lens 16 (the first objective lens 16a and the second objective lens 16b), cylindrical lens 17, concave lens 18, and light sensor 19.

The light flux projected from the light source 11 has a different spreading angle to a direction orthogonal to the optical axis L, and the XY direction (the horizontal direction and the vertical direction) orthogonal to each other.

Then, an XY cross section of this light flux, is about an elliptic shape in which the X direction is a short diameter, and the Y direction is a long diameter.

Operations of the optical pick-up apparatus structured as described above will be described below.

The light flux projected from the light source 11 is incident on the incident surface of the beam-shaper 20 and projected from the outgoing surface after the sectional shape of the light flux is shaped. An action to the light flux by the beam-shaper 20 in this case will be described later.

Next, the light flux projected from this beam-shaper 20 passes the coupling lens 12 and the divergent light is converted into a parallel light, and via beam splitter 13, the light flux is projected in the condition that the diameter of which is enlarged by the beam expander 14, that is, the light flux diameter is enlarged more than that at the time of incident. Then, the light flux passes the first objective lens 16a and is stopped down by the stop 15, and forms a light converging spot on the information recording surface 31 through a protective substrate 30 of the optical information recording medium by the second objective lens 16b.

Then, the apparatus 10 is structured in such a manner that the light flux modulated by an information pit on the information recording surface 31 and reflected passes again the first objective lens 16a, stop 15, the second objective lens 16b, beam expander 14, and is branched by the beam splitter 13. Then, the astigmatism is given by the cylindrical lens 17, and via the concave lens 18, the light flux is incident on the light sensor 19, and by using a signal outputted from the light sensor 19, the reading signal of the information recorded in the optical information recording medium is obtained.

As shown in. FIG. 1, the beam-shaper 20 in the present embodiment is a plastic-made single lens which is a rotation asymmetrical lens.

The linear expansion coefficient $\alpha_n$ of the beam-shaper is in the range of $5.0 \times 10^{-5} < \alpha_n < 8.0 \times 10^{-5}$.

The incident surface 21 of the beam-shaper 20 is formed as a rotation asymmetrical surface to the optical axis L.

Figure 2:
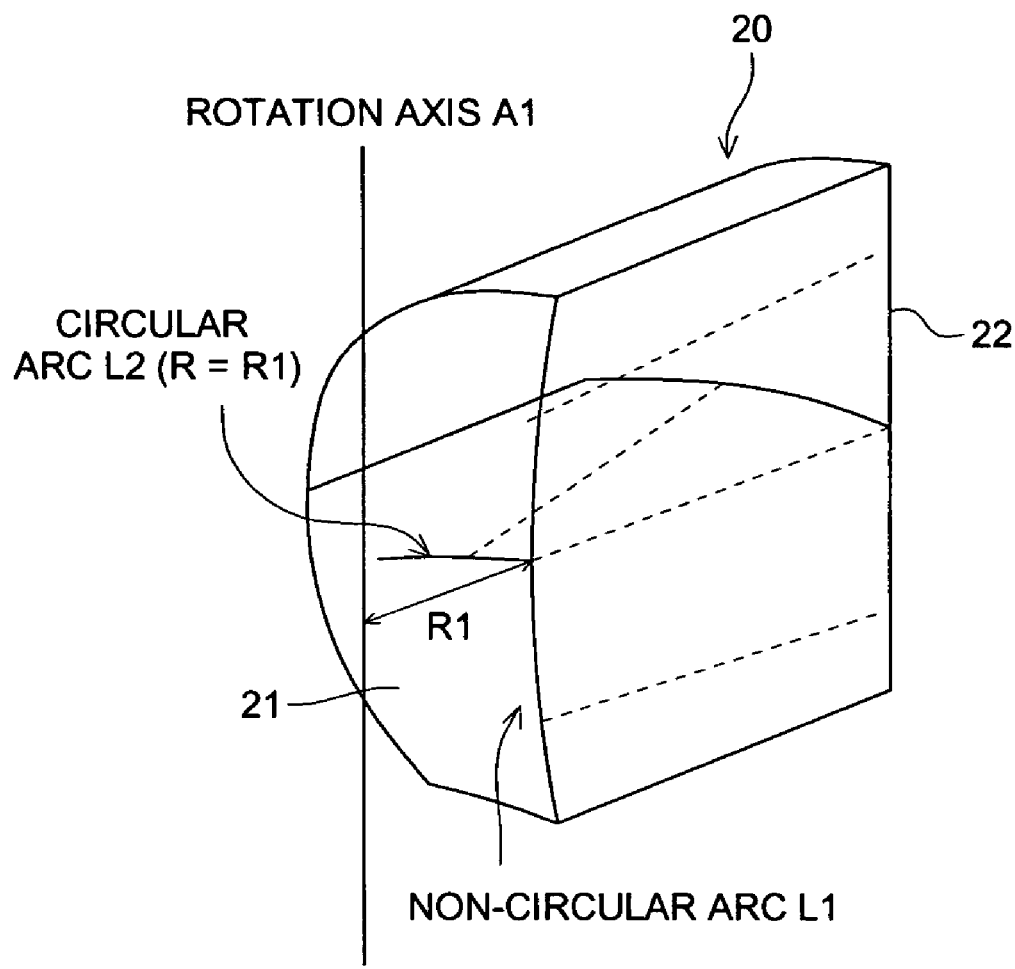
FIG. 2 is a perspective view showing the shape of a beam-shaper.

FIG. 2 is a sectional view depressing the shape of a non-circular arc toroidal surface, and a dotted line in the view shows a light path of the light flux passing inside the beam-shaper 20. Hereupon, an equation (shape function) expressing the non-circular arc toroidal surface will be described later.

The incident surface of the beam-shaper 20 is structured by a surface in which a non-circular line segment L1 (non-circular arc) in YZ surface is rotated around the axis (rotation axis A1) passing the central point of a circular arc L2 of radius R=R1 in a plane orthogonal to this non-circular arc in Y direction.

The outgoing surface 22 of the beam-shaper 20 is formed of a toroidal surface in which the radius of curvature in XZ surface is different from the radius of curvature in YZ surface.

Further, FIG. 5 is a view showing a fixing method of the beam-shaper 20 to the optical pick-up, and as shown in FIG. 5(a), the outgoing surface 22 side of the beam-shaper 20 is fixed to the optical pick-up apparatus 10 main body by the fixing member, and is structured in such a manner that the position in the optical axis direction of the outgoing surface 22 is not relatively and practically changed to the light source 11. Further, as shown in FIG. 5(b), the outgoing surface 22 side of the beam-shaper 20 is directly to the optical pick-up apparatus 10 main body, and is structured in such a manner that the position in the optical axis direction of the outgoing surface 22 is not relatively and practically changed to the light source 11. Hereupon, in FIG. 5(a) and FIG. 5(b), the outgoing surface 22 side of the beam-shaper 20 is fixed to the optical pick-up apparatus 10 main body, however, the incident surface 21 side of the beam-shaper may also be fixed to the optical pick-up apparatus 10 main body.

Then, the beam-shaper 20 converts the incident light flux whose cross section is elliptical, to the light flux whose cross section is almost circular, by the difference of the refractive power between XZ cross section and YZ cross section, and projects the light flux.

Further, in the conventionally used beam-shaper 20, the astigmatism is generated at the time of change of the environmental temperature due to a reason that mainly the refractive power is different in XZ cross section and YZ cross section. However, in the optical pick-up apparatus provided with the beam-shaper 20 of the present invention, it is structured in such a manner that the outgoing surface of the beam-shaper 20 is fixed so that the position in the optical axis direction of the outgoing surface of the beam-shaper 20 is not practically moved to the light source, and because the distance change from the light source 11 to the incident surface 21 activates in the direction to cancel the astigmatism, in turn, even when the astigmatism is generated, as the result, the astigmatism is suppressed. Of course, because the shape is also changed by the linear expansion of the beam-shaper 20 itself due to the temperature change, the astigmatism can be further effectively suppressed.

When specifically described, it is structured in such a manner that, in the cases where the refractive index of the beam-shaper 20 is changed by the environmental temperature change and the change of the projecting angle (an angle formed between the advancing direction of the projecting light flux and the optical axis L) of the light flux in XZ surface and YZ surface thereby, and the change of projecting angle due to a reason that, when the shape of the incident surface 21 and the outgoing surface 22 is changed by the linear expansion, the refractive index of the incident surface 21 and the outgoing surface 22 is changed, and the change of the projecting angle due to a reason that, when the beam-shaper 20 is fixed so that the outgoing surface position is not changed as described above, the position of the incident surface 21 is relatively changed to the light source 11 by the linear expansion, are combined, the direction of the focal line in XZ surface and YZ surface is adjusted, and also after the environmental temperature change, the generation of the astigmatism is suppressed.

Further, in the embodiment in this time, a fixing configuration so that the outgoing surface of the beam-shaper 20 is not practically changed in the optical axis direction to the light source, is shown. However, a configuration fixing the incident surface side depending on the thickness of the beam-shaper or the specification of the optical pick-up apparatus may also be allowed, and in short, it may be allowed when it is a structure fixed so that the astigmatism generated due to the temperature change is generated in the direction in which it is cancelled by the linear expansion of the beam-shaper 20.

Hereupon, as a member fixing the beam-shaper 20 to the apparatus, a material in which the linear expansion is not practically generated even by the change of the environmental temperature, that is, a material whose linear expansion coefficient satisfies $1.0 \times 10^{-5} < \alpha n < 3.0 \times 10^{-5}$, can be used, for example, aluminum may also be used.

In the case of aluminum, the processability and the strength are higher than those of resin, and it is appropriate as the member on the main body side to be fixed.

Hereupon, when the wavelength variation of the projected light flux is generated by the change of the environmental temperature, the design work of the beam-shaper 20 is conducted, considering also the projecting angle change due to this wavelength variation.

As described above, according to the present invention, while the generation of the astigmatism following the change of the environmental temperature is suppressed, a plastic-made beam-shaper 20 by which the divergent beam whose cross sectional shape is almost circular, can be projected, and an optical pick-up apparatus 10 can be obtained.

Hereupon, the structure of the beam-shaper 20 and the optical pick-up apparatus 10 is not limited to those shown in the above embodiment. For example, in the above embodiment, the beam expander 14 and the objective lens 16 are structured by a combination of respective 2 optical elements (the first beam expander 14a and the second beam expander 14b, the first objective lens 16a and the second objective lens 16b), however, it is not limited to this, they may also be respective lens compositions of a single lens. Further, it may also be a structure of the optical pick-up apparatus having so-called the compatibility by which the recording and/or reproducing of the information can be conducted on a plurality of kinds of optical information recording media by using a plurality of light fluxes whose wavelength are different.

Further, the diffractive structure may also be provided on the optical surface of the optical element constituting the optical pick-up apparatus 10. Hereby, the deterioration of the wave-front aberration and/or astigmatism at the time of environmental temperature change using the diffraction light or at the time of the wavelength variation (mode-hop) of the light flux can be compensated for. Further, the wavelength selectivity by which the optical path difference is given only to the incident light flux of the specific wavelength, can be given to it, for example, even in the case where a plurality of kinds of light fluxes whose wavelength are different are projected from the light source 11, the cross sectional shape can be shaped for each light flux.

Figure 3:
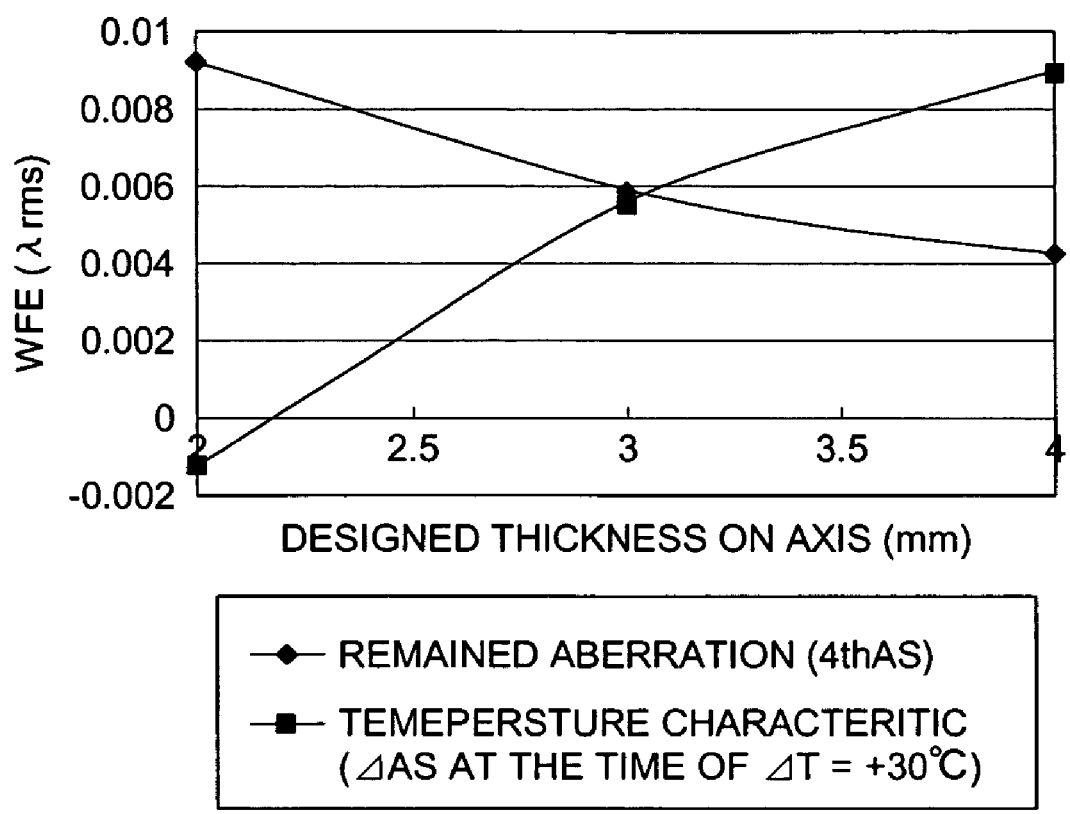
FIG. 3 is a graph showing the relationship between the remained aberration to the designed thickness on the axis and the astigmatism at the time of temperature change.

FIG. 3 is a graph showing an example of a change of the remained aberration (4thAs(tetraphyllous)) and the astigmatism (vertical axis) at the time of the temperature change to the change of the designed thickness on the axis (quadrature axis) in the case where both of the incident surface and the outgoing surface of the beam-shaper 20 are structured by cylindrical surfaces.

When both surfaces of the plastic-made beam-shaper are structured by cylindrical surfaces, the astigmatism to the temperature change can be suppressed to a degree of practically no hindrance, however, as shown in the graph, it is not easy that the beam-shaper which can make the astigmatism at the time of the temperature change and the remained aberration (4thAs(tetraphyllous aberration)) compatible with each other, is structured by both-surface cylindrical surface.

Accordingly, in order to make compatible the astigmatism at the time of the temperature change and the remained aberration (4thAs(tetraphyllous aberration)), it is preferable that at least one of the incident surface and the outgoing surface of the beam-shaper is structured by a toroidal surface.

Hereupon, in the present embodiment, the beam-shaper 20 shapes the incident light flux, from the light source 11, whose cross sectional shape is elliptical, into circular, however, it is not limited to this, the light flux may also be shaped to the elliptical shape in which the long diameter and/or short diameter is different from that in the case of the incidence.

Further, in the present embodiment, the beam-shaper 20 is arranged in the vicinity of the light source 11, however, it is not limited to this, the beam-shaper 20 may be arranged in the optical path of the projected light flux.

Further, in the above embodiment, the light source 11 and the beam-shaper 20 are separated structures, however, as shown in FIG. 6, it may also be a structure in which the beam-shaper 20 is arranged in the vicinity of the light source 11, and they are housed in the same casing, hereby, a light source apparatus having a function by which, even at the time of the environmental temperature change, the generation of the astigmatism is suppressed, is obtained.

Further, a case where the beam-shaper 20 is applied to the optical pick-up apparatus 10, is described, however, it is not limited to this, the beam-shaper 20 can be applied for all of the apparatus such as, for example, a laser beam printer or copier, in which the cross sectional shape of the light flux is shaped to the circle and used.

EXAMPLES

Next, examples 1-6 will be described.

The optical pick-up apparatus in each example is the same structure as that shown in FIG. 1.

As shown in Table 1, Examples 1-3 are examples in which the shaping magnification m of the beam-shaper is constant, and S (a distance on the optical axis from the light source to the incident surface of the beam-shaper) and L (the thickness on the axis of the beam-shaper) is changed, and Examples 4-6 are examples in which S is constant, and m and L are changed.

TABLE 1

Characteristics of Examples

| | m | fc | S | L | L/S | αn | AS3(Δn) | AS3(Δλ) | AS3(ΔL) | AS3(ΔS) | AS3(total) |
|---|---|---|---|---|---|---|---|---|---|---|---|
| (a) | | | | | | | | | | | |
| Ex. A1* | 2.34 | 10 | 1 | 1.75 | 1.750 | 6.4 × E−5 | 0.019 | 0.001 | −0.006 | −0.013 | 0.001 |
| Ex. A2* | 2.34 | 10 | 1.5 | 2.6 | 1.733 | 6.4 × E−5 | 0.029 | 0.002 | −0.011 | −0.019 | 0.000 |
| Ex. A3* | 2.34 | 10 | 2 | 3.45 | 1.725 | 6.4 × E−5 | 0.038 | 0.002 | −0.015 | −0.025 | 0.000 |
| (b) | | | | | | | | | | | |
| Ex. B1* | 1.5 | 12 | 2 | 1.35 | 0.675 | 6.4 × E−5 | 0.018 | 0.001 | −0.012 | −0.008 | 0.000 |
| Ex. B2* | 2 | 12 | 2 | 2.56 | 1.280 | 6.4 × E−5 | 0.034 | 0.002 | −0.013 | −0.020 | 0.002 |
| Ex. B3* | 2.5 | 12 | 2 | 3.11 | 1.555 | 6.4 × E−5 | 0.042 | 0.003 | −0.018 | −0.027 | 0.000 |

*Ex.: Example
**αn: ×E−5
M: Bean shaping magnification
fc(mm): Focal distance of coupling lens
S(mm): Distance on the optical between the light source and the incident surface of the beam-shaper
L(mm): thickness on axis of the beam-shaper
As3(Δn)(λrms): the astigmatism generated following the change of the refractive index of the beam-shaper at the time of temperature change (+30° C.)(dn/dT = −1.2 × E−4 (1/° C.))
AS3(Δλ)(λrms): the astigmatism generated following the change of the oscillation wavelength of the light source at the time of temperature change (+30° C.)(dn/dT = 5.0 × E−2 (nm/° C.))
As3(ΔL)(λrms): the astigmatism generated by the shape change generated when the beam-shaper is linear expanded at the time of temperature change (+30° C.)
As3(ΔS)(λrms): the astigmatism generated by the interval change between the light source and the beam-shaper incident surface generated when the beam-shaper is linear expanded at the time of temperature change (+30° C.)
As3(total)(λrms): the astigmatism generated at the time of temperature change (+30° C.) (total of the above 4 astigmatism)

The lens data of the optical element constituting each optical pick-up apparatus in Examples 1-6 is shown in Tables 2-7.

TABLE 2

Example 1 lens data

Light source wavelength λ = 405 nm
Distance from the light source to the beam-shaper
  Z = 1.000 mm
Incident surface (beam-shaper)
  Radius of curvature on XZ surface
    $R_x$ = −1.3672 × E−1 mm
  Radius of curvature on YZ surface
    $R_y$ = −8.2203 × E−1 mm
  Non-circular arc toroidal coefficient
    $κ_y$ = −0.0000 × E−0
    $A_{y4}$ = −4.6270 × E−1
Thickness on axis
  D = 1.750 mm
Refractive index
  n(405 nm) = 1.525
Outgoing surface
  Radius of curvature on XZ surface
    $R_x$ = −1.3228 × E−0 mm
  Radius of curvature on YZ surface
    $R_y$ = −2.3097 × E−0 mm
Interval (beam-shaper – coupling optical element)
  Z = 5.911 mm
Incident surface (coupling optical element)
  Radius of curvature
    R = +3.8964 × E+1 mm
Thickness on axis
  D = 2.000 mm
Refractive index
  n(405 nm) = 1.525
Outgoing surface
  Radius of curvature
    R = −5.9591 × E−0 mm
  Aspheric surface coefficient
    κ = −1.0000 × E−1
    $A_4$ = +3.0567 × E−4

TABLE 2-continued

Example 1 lens data $A_6$ = +2.7065 × E−5
Interval (coupling optical element – beam-expander)
  Z = 5.000 mm
Incident surface (beam expander)
  Radius of curvature
    R = −8.1743 × E+0 mm
  Aspheric surface coefficient
    κ = −2.9258 × E−1
    $A_4$ = +6.4796 × E−3
    $A_6$ = +8.7198 × E−6
Thickness on axis
  D = 0.800 mm
Refractive index
  n(405 nm) = 1.525
Outgoing surface
  Radius of curvature
    R = +2.3535 × E+1 mm
  Aspheric surface coefficient
    κ = −1.1221 × E+1
    $A_4$ = −2.0771 × E−5
    $A_6$ = +7.7561 × E−6
Interval (beam expander interval)
  Z = 2.000 mm
Incident surface (beam expander)
  Radius of curvature
    R = +1.0000 × E+20 mm
  Optical path difference function (coefficient of optical path difference function: reference wavelength 405 nm)
    C2 −2.4049 × E+1
    C4 −2.2337 × E−1
Thickness on axis
  D = 1.000 mm
Refractive index
  n(405 nm) = 1.525
Outgoing surface
  Radius of curvature
    R = −1.8017 × E+1 mm TABLE 2-continued Example 1 lens data Optical path difference function (coefficient of
optical path difference function: reference wavelength
405 nm)
  $C_2 -2.6978 \times E+1$
  $C_4 +2.2893 \times E-2$
Interval (beam expander – stop)
  $Z = 10.00$ mm
Stop
  $\phi 3.000$ mm
Interval (stop – objective lens)
  $Z = 0.000$ mm
Incident surface (objective lens)
  Radius of curvature
    $R = +2.0966 \times E+0$ mm
  Aspheric surface coefficient
    $\kappa = -1.6811 \times E-1$
    $A_4 = -4.6833 \times E-3$
    $A_6 = +6.1106 \times E-4$
    $A_8 = -9.4660 \times E-4$
    $A_{10} = +2.3384 \times E-4$
    $A_{12} = -1.5568 \times E-4$
    $A_{14} = +6.6382 \times E-5$
    $A_{16} = -1.8857 \times E-5$
Thickness on axis
  $D = 2.500$ mm
Refractive index
  $n(405 \text{ nm}) = 1.525$
Outgoing surface
  Radius of curvature
    $R = +6.2900 \times E+0$ mm
  Aspheric surface coefficient
    $\kappa = -2.2155 \times E-3$
    $A_4 = +1.7541 \times E-2$
    $A_6 = -9.5133 \times E-3$
    $A_8 = -1.7951 \times E-2$
    $A_{10} = +8.9879 \times E-3$
Interval (objective lens interval)
  $Z = 0.050$ mm
Incident surface (objective lens)
  Radius of curvature
    $R = +8.8802 \times E-1$ mm
  Aspheric surface coefficient
    $\kappa = -8.0927 \times E-1$
    $A_4 = +1.1694 \times E-1$
    $A_6 = +2.8874 \times E-2$
    $A_8 = +1.2745 \times E-1$
    $A_{10} = -8.7726 \times E-2$
Thickness on axis
  $D = 1.100$ mm
Refractive index
  $n(405 \text{ nm}) = 1.560$
Outgoing surface (objective lens)
  Radius of curvature
    $R = +1.0000 \times E+20$ mm
Interval (objective lens – disk)
  $Z = 0.256$ mm
Substrate thickness
  $D = 0.100$ mm
Refractive index
  $n(405 \text{ nm}) = 1.619$

TABLE 3

Example 2 lens data

Light source wavelength
  $\lambda = 405$ nm
Distance from light source to beam-shaper
  $Z = 1.500$ mm
Incident surface (beam-shaper)
  Radius of curvature on XZ surface
    $R_x = -2.0492 \times E-1$ mm
  Radius of curvature on YZ surface
    $R_y = -1.2394 \times E-0$ mm TABLE 3-continued Example 2 lens data non-circular arc toroidal coefficient
  $\kappa_y = -0.0000 \times E-0$
  $A_{y4} = -1.3753 \times E-1$
Thickness on axis
  $D = 2.600$ mm
Refractive index
  $n(405 \text{ nm}) = 1.525$
Outgoing surface
  Radius of curvature on XZ surface
    $R_x = -1.9680 \times E-0$ mm
  Radius of curvature on YZ surface
    $R_y = -3.4591 \times E-0$ mm
Interval (beam-shaper – coupling optical element)
  $Z = 4.483$ mm
Incident surface (coupling optical element)
  Radius of curvature
    $R_x = +3.8964 \times E+1$ mm
Thickness on axis
  $D = 2.000$ mm
Refractive index
  $n(405 \text{ nm}) = 1.525$
Outgoing surface
  Radius of curvature
    $R = -5.9591 \times E-0$ mm
  Aspheric surface coefficient
    $\kappa = -1.0000 \times E-1$
    $A_4 = +2.8099 \times E-4$
    $A_6 = +2.7162 \times E-5$
Interval (coupling optical element – beam expander)
  $Z = 5.000$ mm
Incident surface (beam expander)
  Radius of curvature
    $R = -8.1743 \times E+0$ mm
  Aspheric surface coefficient
    $\kappa = -2.9258 \times E-1$
    $A_4 = +6.4796 \times E-3$
    $A_6 = +8.7198 \times E-6$
Thickness on axis
  $D = 0.800$ mm
Refractive index
  $n(405 \text{ nm}) = 1.525$
Outgoing surface
  Radius of curvature
    $R = +2.3535 \times E+1$ mm
  Aspheric surface coefficient
    $\kappa = -1.1221 \times E+1$
    $A_4 = -2.0771 \times E-5$
    $A_6 = +7.7561 \times E-6$
Interval (beam expander interval)
  $Z = 2.000$ mm
Incident surface (beam expander)
  Radius of curvature
    $R = +1.0000 \times E+20$ mm
  Optical path difference function
  (coefficient of optical path difference function:
  reference wavelength 405 nm)
    $C_2 -2.4049 \times E+1$
    $C_4 -2.2337 \times E-1$
Thickness on axis
  $D = 1.000$ mm
Refractive index
  $n(405 \text{ nm}) = 1.525$
Outgoing surface
  Radius of curvature
    $R = -1.8017 \times E+1$ mm
  Optical path difference function
  (coefficient of optical path difference function:
  reference wavelength 405 nm)
    $C_2 -2.6978 \times E+1$
    $C_4 +2.2893 \times E-2$
Interval (beam expander – stop)
  $Z = 10.00$ mm
Stop
  $\phi 3.000$ mm
Interval (stop – objective lens)
  $Z = 0.000$ mm
Incident surface (objective lens)

TABLE 3-continued

Example 2 lens data

Radius of curvature
R = +2.0966 × E+0 mm
Aspheric surface coefficient
κ = −1.6811 × E−1
$A_4$ = −4.6833 × E−3
$A_6$ = +6.1106 × E−4
$A_8$ = −9.4660 × E−4
$A_{10}$ = +2.3384 × E−4
$A_{12}$ = −1.5568 × E−4
$A_{14}$ = +6.6382 × E−5
$A_{16}$ = −1.8857 × E−5
Thickness on axis
D = 2.500 mm
Refractive index
n(405 nm) = 1.525
Outgoing surface
Radius of curvature
R = +6.2900 × E+0 mm
Aspheric surface coefficient
κ = −2.2155 × E−3
$A_4$ = +1.7541 × E−2
$A_6$ = −9.5133 × E−3
$A_8$ = −1.7951 × E−2
$A_{10}$ = +8.9879 × E−3
Interval (objective lens interval)
Z = 0.050 mm
Incident surface (objective lens)
Radius of curvature
R = +8.8802 × E−1 mm
Aspheric surface coefficient
κ = −8.0927 × E−1
$A_4$ = +1.1694 × E−1
$A_6$ = +2.8874 × E−2
$A_8$ = +1.2745 × E−1
$A_{10}$ = −8.7726 × E−2
Thickness on axis
D = 1.100 mm
Refractive index
n(405 nm) = 1.560
Outgoing surface (objective lens)
Radius of curvature
R = +1.0000 × E+20 mm
Interval (objective lens – disk)
Z = 0.256 mm
Substrate thickness
D = 0.100 mm
Refractive index
n(405 nm) = 1.619

TABLE 4

Example 3 lens data

Light source wavelength
λ = 405 nm
Distance from light source to beam-shaper
Z = 2.000 mm
Incident surface (beam-shaper)
Radius of curvature on XZ surface
$R_x$ = −2.7314 × E−1 mm
Radius of curvature on YZ surface
$R_y$ = −1.6572 × E−0 mm
Non-circular arc toroidal coefficient
$κ_y$ = −0.0000 × E−0
$A_{y4}$ = −5.8133 × E−2
Thickness on axis
D = 3.450 mm
Refractive index
n(405 nm) = 1.525
Outgoing surface
Radius of curvature on XZ surface
$R_x$ = −2.6142 × E−0 mm
Radius of curvature on YZ surface
$R_y$ = −4.6120 × E−0 mm TABLE 4-continued Example 3 lens data Interval (beam-shaper – coupling optical element)
Z = 3.058 mm
Incident surface (coupling optical element)
Radius of curvature
R = +3.8964 × E+1 mm
Thickness on axis
D = 2.000 mm
Refractive index
n(405 nm) = 1.525
Outgoing surface
Radius of curvature
R = −5.9591 × E−0 mm
Aspheric surface coefficient
κ = −1.0000 × E−1
$A_4$ = +2.5641 × E−4
$A_6$ = +2.7218 × E−5
Interval (coupling optical element – beam expander)
Z = 5.000 mm
Incident surface (beam expander)
Radius of curvature
R = −8.1743 × E+0 mm
Aspheric surface coefficient
κ = −2.9258 × E−1
$A_4$ = +6.4796 × E−3
$A_6$ = +8.7198 × E−6
Thickness on axis
D = 0.800 mm
Refractive index
n(405 nm) = 1.525
Outgoing surface
Radius of curvature
R = +2.3535 × E+1 mm
Aspheric surface coefficient
κ = −1.1221 × E+1
$A_4$ = −2.0771 × E−5
$A_6$ = +7.7561 × E−6
Interval (beam expander interval)
Z = 2.000 mm
Incident surface (beam expander)
Radius of curvature
R = +1.0000 × E+20 mm
Optical path difference function
(coefficient of optical path difference function:
reference wavelength 405 nm)
C2 −2.4049 × E+1
C4 −2.2337 × E−1
Thickness on axis
D = 1.000 mm
Refractive index
n(405 nm) = 1.525
Outgoing surface
Radius of curvature
R = −1.8017 × E+1 mm
Optical path difference function
(coefficient of optical path difference function:
reference wavelength 405 nm)
C2 −2.6978 × E+1
C4 +2.2893 × E−2
Interval (beam expander – stop)
Z = 10.00 mm
Stop
φ 3.000 mm
Interval (stop – objective lens)
Z = 0.000 mm
Incident surface (objective lens)
Radius of curvature
R = +2.0966 × E+0 mm
Aspheric surface coefficient
κ = −1.6811 × E−1
$A_4$ = −4.6833 × E−3
$A_6$ = +6.1106 × E−4
$A_8$ = −9.4660 × E−4
$A_{10}$ = +2.3384 × E−4
$A_{12}$ = −1.5568 × E−4
$A_{14}$ = +6.6382 × E−5
$A_{16}$ = −1.8857 × E−5

TABLE 4-continued

Example 3 lens data

Thickness on axis
  D = 2.500 mm
Refractive index
  n(405 nm) = 1.525
Outgoing surface
  Radius of curvature
    R = +6.2900 × E+0 mm
  Aspheric surface coefficient
    $\kappa$ = −2.2155 × E−3
    $A_4$ = +1.7541 × E−2
    $A_6$ = −9.5133 × E−3
    $A_8$ = −1.7951 × E−2
    $A_{10}$ = +8.9879 × E−3
Interval (objective lens interval)
  Z = 0.050 mm
Incident surface (objective lens)
  Radius of curvature
    R = +8.8802 × E−1 mm
  Aspheric surface coefficient
    $\kappa$ = −8.0927 × E−1
    $A_4$ = +1.1694 × E−1
    $A_6$ = +2.8874 × E−2
    $A_8$ = +1.2745 × E−1
    $A_{10}$ = −8.7726 × E−2
Thickness on axis
  D = 1.100 mm
Refractive index
  n(405 nm) = 1.560
Outgoing surface (objective lens)
  Radius of curvature
    R = +1.0000 × E+20 mm
Interval (objective lens − disk)
  Z = 0.256 mm
Substrate thickness
  D = 0.100 mm
Refractive index
  n(405 nm) = 1.619

TABLE 5

Example 4 lens data

Light source wavelength
  $\lambda$ = 405 nm
Distance from light source to beam-shaper
  Z = 2.000 mm
Incident surface (beam-shaper)
  Radius of curvature on XZ surface
    $R_x$ = −4.6475 × E−1 mm
  Radius of curvature on YZ surface
    $R_y$ = −2.3060 × E−0 mm
  Non-circular arc toroidal coefficient
    $\kappa_y$ = −0.0000 × E−0
    $A_{y4}$ = +7.5152 × E−3
Thickness on axis
  D = 1.350 mm
Refractive index
  n(405 nm) = 1.525
Outgoing surface
  Radius of curvature on XZ surface
    $R_x$ = −1.2127 × E−0 mm
  Radius of curvature on YZ surface
    $R_y$ = −2.5200 × E−0 mm
Interval (beam-shaper − coupling optical element)
  Z = 6.560 mm
Incident surface (coupling optical element)
  Radius of curvature
    R = +5.0247 × E+1 mm
Thickness on axis
  D = 2.000 mm
Refractive index
  n(405 nm) = 1.525

TABLE 5-continued

Example 4 lens data

Outgoing surface
  Radius of curvature
    R = −7.1036 × E−0 mm
  Aspheric surface coefficient
    $\kappa$ = −1.0000 × E−1
    $A_4$ = +2.0406 × E−4
    $A_6$ = +2.2179 × E−5
Interval (coupling optical element − beam expander)
  Z = 5.000 mm
Incident surface (beam expander)
  Radius of curvature
    R = −8.1743 × E+0 mm
  Aspheric surface coefficient
    $\kappa$ = −2.9258 × E−1
    $A_4$ = +6.4796 × E−3
    $A_6$ = +8.7198 × E−6
Thickness on axis
  D = 0.800 mm
Refractive index
  n(405 nm) = 1.525
Outgoing surface
  Radius of curvature
    R = +2.3535 × E+1 mm
  Aspheric surface coefficient
    $\kappa$ = −1.1221 × E+1
    $A_4$ = −2.0771 × E−5
    $A_6$ = +7.7561 × E−6
Interval (beam expander interval)
  Z = 2.000 mm
Incident surface (beam expander)
  Radius of curvature
    R = +1.0000 × E+20 mm
  Optical path difference function (coefficient of
  optical path difference function: reference wavelength 405 nm)
    C2 −2.4049 × E+1
    C4 −2.2337 × E−1
Thickness on axis
  D = 1.000 mm
Refractive index
  n(405 nm) = 1.525
Outgoing surface
  Radius of curvature
    R = −1.8017 × E+1 mm
  Optical path difference function (coefficient of
  optical path difference function: reference wavelength 405 nm)
    C2 −2.6978 × E+1
    C4 +2.2893 × E−2
Interval (beam expander − stop)
  Z = 10.00 mm
Stop
  $\phi$ 3.000 mm
Interval (stop − objective lens)
  Z = 0.000 mm
Incident surface (objective lens)
  Radius of curvature
    R = +2.0966 × E+0 mm
  Aspheric surface coefficient
    $\kappa$ = −1.6811 × E−1
    $A_4$ = −4.6833 × E−3
    $A_6$ = +6.1106 × E−4
    $A_8$ = −9.4660 × E−4
    $A_{10}$ = +2.3384 × E−4
    $A_{12}$ = −1.5568 × E−4
    $A_{14}$ = +6.6382 × E−5
    $A_{16}$ = −1.8857 × E−5
Thickness on axis
  D = 2.500 mm
Refractive index
  n(405 nm) = 1.525
Outgoing surface (objective lens)
  Radius of curvature
    R = +6.2900 × E+0 mm
  Aspheric surface coefficient
    $\kappa$ = −2.2155 × E−3
    $A_4$ = +1.7541 × E−2
    $A_6$ = −9.5133 × E−3
    $A_8$ = −1.7951 × E−2

TABLE 5-continued

Example 4 lens data $A_{10} = +8.9879 \times E-3$
Interval (objective lens interval)
$Z = 0.050$ mm
Incident surface (objective lens)
Radius of curvature
$R = +8.8802 \times E-1$ mm
Aspheric surface coefficient
$\kappa = -8.0927 \times E-1$
$A_4 = +1.1694 \times E-1$
$A_6 = +2.8874 \times E-2$
$A_8 = +1.2745 \times E-1$
$A_{10} = -8.7726 \times E-2$
Thickness on axis
$D = 1.100$ mm
Refractive index
$n(405 \text{ nm}) = 1.560$
Outgoing surface (objective lens)
Radius of curvature
$R = +1.0000 \times E+20$ mm
Interval (objective lens – disk)
$Z = 0.256$ mm
Substrate thickness
$D = 0.100$ mm
Refractive index
$n(405 \text{ nm}) = 1.619$

TABLE 6

Example 5 lens data

Light source wavelength
$\lambda = 405$ nm
Distance from light source to beam-shaper
$Z = 2.000$ mm
Incident surface (beam-shaper)
Radius of curvature on XZ surface
$R_x = -3.3226 \times E-1$ mm
Radius of curvature on YZ surface
$R_y = -1.9469 \times E-0$ mm
Non-circular arc toroidal coefficient
$\kappa_y = -0.0000 \times E-0$
$A_{y4} = -4.1077 \times E-3$
Thickness on axis
$D = 2.560$ mm
Refractive index
$n(405 \text{ nm}) = 1.525$
Outgoing surface
Radius of curvature on XZ surface
$R_x = -1.7774 \times E-0$ mm
Radius of curvature on YZ surface
$R_y = -3.1233 \times E-0$ mm
Interval (beam-shaper – coupling optical element)
$Z = 4.867$ mm
Incident surface (coupling optical element)
Radius of curvature
$R = +5.0247 \times E+1$ mm
Thickness on axis
$D = 2.000$ mm
Refractive index
$n(405 \text{ nm}) = 1.525$
Outgoing surface
Radius of curvature
$R = -7.1036 \times E-0$ mm
Aspheric surface coefficient
$\kappa = -1.0000 \times E-1$
$A_4 = +1.7507 \times E-4$
$A_6 = +2.1905 \times E-5$
Interval (coupling optical element – beam expander)
$Z = 5.000$ mm
Incident surface (beam expander)
Radius of curvature
$R = -8.1743 \times E-0$ mm
Aspheric surface coefficient
$\kappa = -2.9258 \times E-1$

TABLE 6-continued

Example 5 lens data $A_4 = +6.4796 \times E-3$
$A_6 = +8.7198 \times E-6$
Thickness on axis
$D = 0.800$ mm
Refractive index
$n(405 \text{ nm}) = 1.525$
Outgoing surface
Radius of curvature
$R = +2.3535 \times E+1$ mm
Aspheric surface coefficient
$\kappa = -1.1221 \times E+1$
$A_4 = -2.0771 \times E-5$
$A_6 = +7.7561 \times E-6$
Interval (beam expander interval)
$Z = 2.000$ mm
Incident surface (beam expander)
Radius of curvature
$R = +1.0000 \times E+20$ mm
Optical path difference function
(coefficient of optical path difference function:
reference wavelength 405 nm)
C2 $-2.4049 \times E+1$
C4 $-2.2337 \times E-1$
Thickness on axis
$D = 1.000$ mm
Refractive index
$n(405 \text{ nm}) = 1.525$
Outgoing surface
Radius of curvature
$R = -1.8017 \times E+1$ mm
Optical path difference function
(coefficient of optical path difference function:
reference wavelength 405 nm)
C2 $-2.6978 \times E+1$
C4 $+2.2893 \times E-2$
Interval (beam expander – stop)
$Z = 10.00$ mm
Stop
$\phi$ 3.000 mm
Interval (stop – objective lens)
$Z = 0.000$ mm
Incident surface (objective lens)
Radius of curvature
$R = +2.0966 \times E+0$ mm
Aspheric surface coefficient
$\kappa = -1.6811 \times E-1$
$A_4 = -4.6833 \times E-3$
$A_6 = +6.1106 \times E-4$
$A_8 = -9.4660 \times E-4$
$A_{10} = +2.3384 \times E-4$
$A_{12} = -1.5568 \times E-4$
$A_{14} = +6.6382 \times E-5$
$A_{16} = -1.8857 \times E-5$
Thickness on axis
$D = 2.500$ mm
Refractive index
$n(405 \text{ nm}) = 1.525$
Outgoing surface (objective lens)
Radius of curvature
$R = +6.2900 \times E+0$ mm
Aspheric surface coefficient
$\kappa = -2.2155 \times E-3$
$A_4 = +1.7541 \times E-2$
$A_6 = -9.5133 \times E-3$
$A_8 = -1.7951 \times E-2$
$A_{10} = +8.9879 \times E-3$
Interval (objective lens interval)
$Z = 0.050$ mm
Incident surface (objective lens)
Radius of curvature
$R = +8.8802 \times E-1$ mm
Aspheric surface coefficient
$\kappa = -8.0927 \times E-1$
$A_4 = +1.1694 \times E-1$
$A_6 = +2.8874 \times E-2$
$A_8 = +1.2745 \times E-1$
$A_{10} = -8.7726 \times E-2$ TABLE 6-continued Example 5 lens data Thickness on axis
$D = 1.100$ mm
Refractive index
$n(405 \text{ nm}) = 1.560$
Outgoing surface (objective lens)
Radius of curvature
$R = +1.0000 \times E+20$ mm
Interval (objective lens – disk)
$Z = 0.256$ mm
Substrate thickness
$D = 0.100$ mm
Refractive index
$n(405 \text{ nm}) = 1.619$

TABLE 7

Example 6 lens data

Light source wavelength
$\lambda = 405$ nm
Distance from light source to beam-shaper
$Z = 2.000$ mm
Incident surface (beam-shaper)
Radius of curvature on XZ surface
$R_x = -2.5901 \times E-1$ mm
Radius of curvature on YZ surface
$R_y = -2.1024 \times E-0$ mm
Non-circular arc toroidal coefficient
$\kappa_y = -0.0000 \times E-0$
$A_{y,4} = -1.2959 \times E-3$
Thickness on axis
$D = 3.110$ mm
Refractive index
$n(405 \text{ nm}) = 1.525$
Outgoing surface
Radius of curvature on XZ surface
$R_x = -2.0275 \times E-0$ mm
Radius of curvature on YZ surface
$R_y = -3.6277 \times E-0$ mm
Interval (beam-shaper – coupling optical element)
$Z = 4.239$ mm
Incident surface (coupling optical element)
Radius of curvature
$R = +5.0247 \times E+1$ mm
Thickness on axis
$D = 2.000$ mm
Refractive index
$n(405 \text{ nm}) = 1.525$
Outgoing surface
Radius of curvature
$R = -7.1036 \times E-0$ mm
Aspheric surface coefficient
$\kappa = -1.0000 \times E-1$
$A_4 = +1.5525 \times E-4$
$A_6 = +2.1947 \times E-5$
Interval (coupling optical element – beam expander)
$Z = 5.000$ mm
Incident surface (beam expander)
Radius of curvature
$R = -8.1743 \times E+0$ mm
Aspheric surface coefficient
$\kappa = -2.9258 \times E-1$
$A_4 = +6.4796 \times E-3$
$A_6 = +8.7198 \times E-6$
Thickness on axis
$D = 0.800$ mm
Refractive index
$n(405 \text{ nm}) = 1.525$
Outgoing surface
Radius of curvature
$R = +2.3535 \times E+1$ mm
Aspheric surface coefficient
$\kappa = -1.1221 \times E+1$
$A_4 = -2.0771 \times E-5$ TABLE 7-continued Example 6 lens data $A_6 = +7.7561 \times E-6$
Interval (beam expander interval)
$Z = 2.000$ mm
Incident surface (beam expander)
Radius of curvature
$R = +1.0000 \times E+20$ mm
Optical path difference function (coefficient of
optical path difference function: reference wavelength 405 nm)
$C_2$ $-2.4049 \times E+1$
$C_4$ $-2.2337 \times E+1$
Thickness on axis
$D = 1.000$ mm
Refractive index
$n(405 \text{ nm}) = 1.525$
Outgoing surface
Radius of curvature
$R = -1.8017 \times E+1$ mm
Optical path difference function (coefficient of
optical path difference function: reference wavelength 405 nm)
$C_2$ $-2.6978 \times E+1$
$C_4$ $+2.2893 \times E-2$
Interval (beam expander – stop)
$Z = 10.00$ mm
Stop
$\phi$ 3.000 mm
Interval (stop – objective lens)
$Z = 0.000$ mm
Incident surface (objective lens)
Radius of curvature
$R = +2.0966 \times E+0$ mm
Aspheric surface coefficient
$\kappa = -1.6811 \times E-1$
$A_4 = -4.6833 \times E-3$
$A_6 = +6.1106 \times E-4$
$A_8 = -9.4660 \times E-4$
$A_{10} = +2.3384 \times E-4$
$A_{12} = -1.5568 \times E-4$
$A_{14} = +6.6382 \times E-5$
$A_{16} = -1.8857 \times E-5$
Thickness on axis
$D = 2.500$ mm
Refractive index
$n(405 \text{ nm}) = 1.525$
Outgoing surface (objective lens)
Radius of curvature
$R = +6.2900 \times E+0$ mm
Aspheric surface coefficient
$\kappa = -2.2155 \times E-3$
$A_4 = +1.7541 \times E-2$
$A_6 = -9.5133 \times E-3$
$A_8 = -1.7951 \times E-2$
$A_{10} = +8.9879 \times E-3$
Interval (objective lens interval)
$Z = 0.050$ mm
Incident surface (objective lens)
Radius of curvature
$R = +8.8802 \times E-1$ mm
Aspheric surface coefficient
$\kappa = -8.0927 \times E-1$
$A_4 = +1.1694 \times E-1$
$A_6 = +2.8874 \times E-2$
$A_8 = +1.2745 \times E-1$
$A_{10} = -8.7726 \times E-2$
Thickness on axis
$D = 1.100$ mm
Refractive index
$n(405 \text{ nm}) = 1.560$
Outgoing surface (objective lens)
Radius of curvature
$R = +1.0000 \times E+20$ mm
Interval (objective lens – disk)
$Z = 0.256$ mm
Substrate thickness
$D = 0.100$ mm
Refractive index
$n(405 \text{ nm}) = 1.619$ The incident surface of the beam-shaper is structured by the non-circular arc toroidal surface which is regulated by the equation in which coefficients shown in Tables 2-7 are substituted into Math-1.

$$(Z - R_x)^2 + X^2 = \left( R_x - \frac{Y^2}{R_y(1 + \sqrt{1 - (1 + k_y)Y^2/R_y^2})} + \sum_i A_{yi} Y^i \right)^2 \quad \text{[Math-1]}$$

Herein, Z is a distance in the optical axis L direction (an advancing direction of the light is positive), X, Y are distances in X-direction direction, Y-direction (height from the optical axis), $R_x$ is a paraxial radius of curvature on XZ surface, $R_y$ is a paraxial radius of curvature on YZ surface, $k_y$ and $A_{yi}$ are non-circular arc coefficients.

Hereupon, in Tables 2-7, for example, "$-1.3672 \times E-1$" means "$-1.3672 \times 10^{-1}$".

The outgoing surface of the beam-shaper is structured by a toroidal surface regulated by an equation in which coefficients shown in Tables 2-7 are substituted into Math-3.

$$(Z - R_x)^2 + X^2 = \left( R_x - \frac{Y^2}{(1 + \sqrt{1 - Y^2/R_y^2})} \right) \quad \text{[Math-3]}$$

Further, the incident surface of the coupling lens (coupring optical element) and the outgoing surface of the second objective lens are respectively formed into a spherical surface of the radius of curvature R around the optical axis.

Further, the outgoing surface of the coupling lens, incident surface and outgoing surface of the first beam expander, incident surface and outgoing surface of the first objective lens, and incident surface of the second objective lens are respectively formed into the aspheric surface which is axially symmetric around the optical axis L, regulated by the equation in which coefficients shown in Tables 2-7 are substituted into Math-5.

Aspheric surface shape equation [Math-5]

$$z = \frac{(h^2/r_i)}{1 + \sqrt{1 - (1 + \kappa)(h/r_i)^2}} + \sum_{i=0} A_{2i} h^{2i}$$

Herein, $\kappa$ is a conical coefficient, $A_{2i}$ is an aspheric surface coefficient, h is a distance from the optical axis. Further, the diffraction ring-shaped zone around the optical axis is formed on the incident surface and the outgoing surface of the second beam expander, and a pitch of the diffraction ring-shaped zone is regulated by the equation in which coefficients shown in Tables 2-7 are substituted into the optical path difference function of Math-6.

Optical path difference function [Math-6]

$$\phi(h) = \sum_{i=0} C_{2i} h^{2i}$$

Herein, C2i is a coefficient of the optical path difference function.

Hereupon, in Tables 2-7, "reference wavelength" indicates so-called the blaze wavelength, and a wavelength in which, when the light flux having that wavelength is incident on the lens, the diffraction efficiency of the diffraction light of all-orders generated by the diffractive structure is the maximum (for example, 100%).

AS3 (total) of Table 1(*a*) and (*b*) shows, when the temperature rises 30° C., a total of 4 astigmatisms (AS3($\Delta$n), AS3($\Delta\lambda$), AS3($\Delta$L), AS3($\Delta$S)).

According to the beam-shaper and the optical pick-up apparatus in the present embodiment, it can be seen from Table 1 that, even when the environmental temperature is changed, the generation of the astigmatism can be suppressed.

(Table 8)
(a)
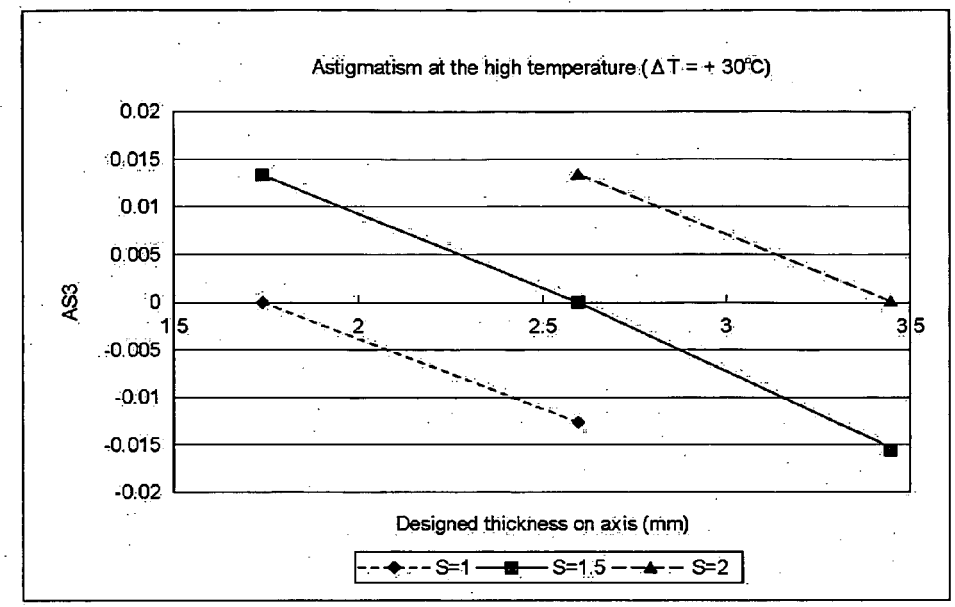
(b)
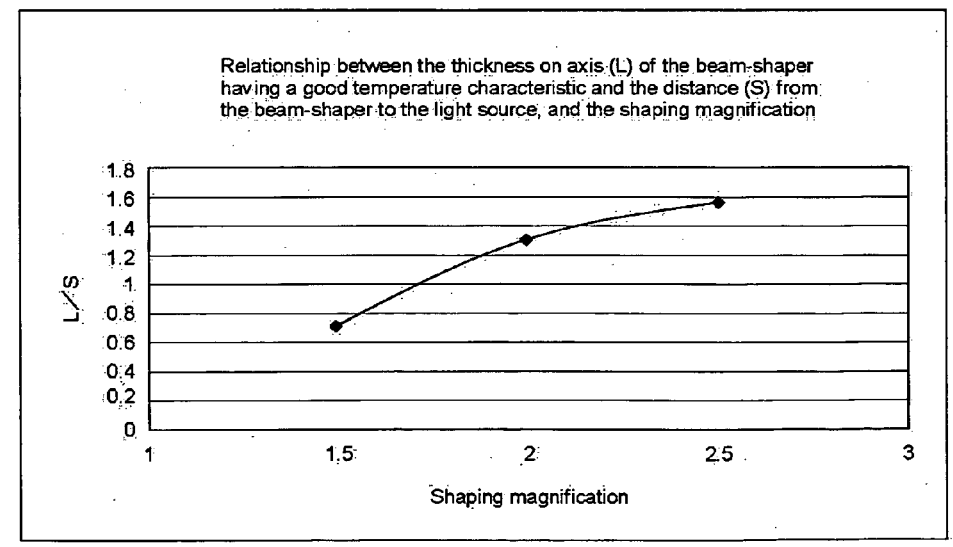

In the structure of Examples 1-3, Table 8(a) is a graph expressing the relationship between a change amount of the astigmatism AS3 at the time of the environmental temperature change and L when S is changed such as S=1, 1.5, 2.0.

In the structure of Examples 4-6, Table 8(b) is a graph expressing the relationship between L/S and the shaping magnification m.

From Table 8(a), it can be seen that a change amount of the astigmatism at the time of temperature change can be suppressed to almost zero, when the optical pick-up apparatus and the beam-shaper are designed by having an eye to a fact that the proportional relationship is attained between S and L.

From Table 8(b), when the relationship between L/S and m is perceived, in the optical pick-up apparatus and the beam-shaper, a generation amount of the astigmatism at the time of temperature change can be suppressed. Specifically, when the beam shaping magnification is increased, the refractive power in X direction and in Y direction is largely different, and a change amount of the astigmatism at the time of temperature change is increased. Therefore, when L/S is increased, the change amount of the astigmatism at the time of temperature change can be suppressed.

Next, Examples 7-11 will be described.

Figure 4:
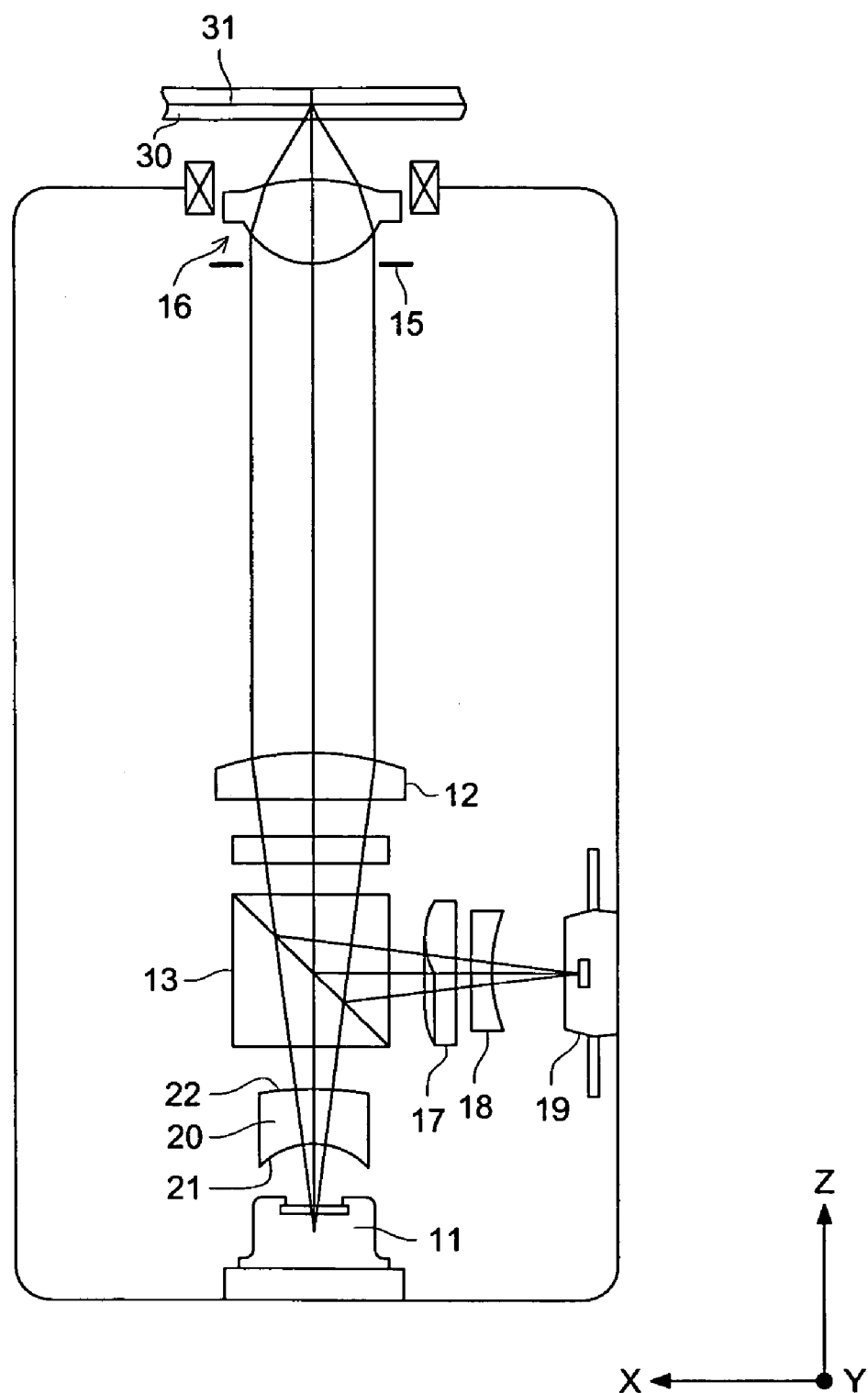
FIG. 4 is a plan view showing the structure of the optical pick-up apparatus.

The optical pick-up apparatus in each Example is the same structure as that shown in FIG. 4, and a detailed description is neglected, however, a beam expander 14 is removed from the structure of the optical pick-up apparatus 10 shown in FIG. 1, and the objective lens 16 is structured by a single lens.

In the beam-shaper of Example 7, both of the incident surface (the third surface) and the outgoing surface (the fourth surface) are structured by a cylindrical surface, and the surface shape of the incident surface is regulated by the equation in which coefficients shown in Table 9 are substituted into Math-1.

Hereupon, as in Example 7, when the cylindrical surface is regulated by using Math-1, Math-3, $R_x=\infty$ is substituted into Math-1, Math-3, and when the cylindrical surface is regulated by using Math-2, Math-4, $R_y=\infty$ is substituted into Math-2, Math-4.

In the beam-shaper of Example 8, the incident surface is structured by a toroidal surface shown in Math-4, and the outgoing surface is structured by a non-circular arc toroidal surface shown in Math-1, and the surface shape of the incident surface and outgoing surface is regulated by an equation in which coefficients shown in Table 10 are substituted into each expression.

In the beam-shaper of Example 9, the incident surface is structured by a toroidal surface shown in Math-4, and the outgoing surface is structured by a non-circular arc toroidal surface shown in Math-1, and the surface shape of the incident surface and outgoing surface is regulated by an equation in which coefficients shown in Table 11 are substituted into each expression.

In the beam-shaper of Example 10, the incident surface is structured by a toroidal surface shown in Math-3, and the outgoing surface is structured by a non-circular arc toroidal surface shown in Math-2, and the surface shape of the incident surface and outgoing surface is regulated by an equation in which coefficients shown in Table 12 are substituted into each expression.

In the beam-shaper of Example 11, the incident surface is structured by a toroidal surface shown in Math-3, and the outgoing surface is structured by a non-circular arc toroidal surface shown in Math-1, and the surface shape of the incident surface and outgoing surface is regulated by an equation in which coefficients shown in Table 13 are substituted into each expression.

TABLE 9

Example 7 lens data

| | 407 nm | |
|---|---|---|
| | X | Y |
| object point side NA | 0.145 | 0.057 |
| image point side NA | 0.650 | 0.650 |
| wave-front aberration | 0.010 λ | |
| tetraphyllious aberration | 0.009 λ | |
| temperature characteristic | −0.001 λ *1 | |

*1: astigmatism generated at ΔT = +30° C.

| i-th surface | $r_{yi}$ | $r_{xi}$ | $d_i$(407 nm) | $n_i$(407 nm) |
|---|---|---|---|---|
| 0 | | | 0.2513 | |
| 1 | ∞ | ∞ | 0.2500 | 1.52994 |
| 2 | ∞ | ∞ | 1.1853 | 0.00000 |
| 3 | −0.2520 | ∞ | 2.0000 | 1.52461 |
| 4 | −2.0871 | ∞ | 2.0000 | 1.00000 |
| 5 | ∞ | ∞ | 8.0000 | 1.52994 |
| 6 | ∞ | ∞ | 2.2810 | 1.00000 |
| 7 | 32.4251 | 32.4251 | 2.0000 | 1.52461 |
| 8 | −8.8439 | −8.8439 | 5.0000 | 1.00000 |
| 9 | ∞ | ∞ | 0.0000 | 1.00000 |
| 10 | 1.9327 | 1.9327 | 1.8500 | 1.55981 |
| 11 | −11.3206 | −11.3206 | 1.5567 | 1.00000 |
| 12 | ∞ | ∞ | 0.6000 | 1.61869 |
| 13 | ∞ | ∞ | 0.0000 | 1.00000 |

The 3rd surface cylindrical surface
The 4th surface cylindrical surface $A_{y4}$ = −9.5723E−04

The 8th surface aspheric surface coefficient

κ = −1.0000E−01
$A_4$ = 1.4465E−04
$A_6$ = 1.5346E−06

The 10th surface aspheric surface coefficient

κ = −5.4726E−01
$A_4$ = 3.7831E−04
$A_6$ = −1.8413E−03
$A_8$ = 6.4043E−04
$A_{10}$ = −9.8987E−05
$A_{12}$ = −1.1518E−06
$A_{14}$ = −7.9320E−07

Optical path difference function (Coefficient of optical path difference function: reference wavelength 422 nm, diffraction order 8th-order (407 nm))

$C_2$ = −7.7249E−04
$C_4$ = −2.0466E−04
$C_6$ = −8.5677E−05
$C_8$ = 2.6999E−05
$C_{10}$ = −4.1167E−06

The 11th surface aspheric surface coefficient

κ = −3.3066E+02
A4 = −3.7387E−03
A6 = 8.8025E−03
A8 = −5.2282E−03
A10 = 1.4815E−03
A12 = −2.1825E−04
A14 = 1.3236E−05

TABLE 10

Example 8 lens data

| | 407 nm | |
|---|---|---|
| | X | Y |
| object point side NA | 0.145 | 0.057 |
| image point side NA | 0.650 | 0.650 |
| wave-front aberration | 0.008 λ | |
| tetraphyllious aberration | 0.007 λ | |
| temperature characteristic | 0.000 λ *1 | |

*1: astigmatism generated at ΔT = +30° C.

| i-th surface | $r_{yi}$ | $r_{xi}$ | $d_i$(407 nm) | $n_i$(407 nm) |
|---|---|---|---|---|
| 0 | | | 0.2513 | |
| 1 | ∞ | ∞ | 0.2500 | 1.52994 |
| 2 | ∞ | ∞ | 1.1853 | 0.00000 |
| 3 | −0.2530 | −243.2876 | 2.0000 | 1.52461 |
| 4 | −2.0865 | −798.7465 | 2.0000 | 1.00000 |
| 5 | ∞ | ∞ | 8.0000 | 1.52994 |
| 6 | ∞ | ∞ | 2.2810 | 1.00000 |
| 7 | 32.4251 | 32.4251 | 2.0000 | 1.52461 |
| 8 | −8.8439 | −8.8439 | 5.0000 | 1.00000 |
| 9 | ∞ | ∞ | 0.0000 | 1.00000 |
| 10 | 1.9327 | 1.9327 | 1.8500 | 1.55981 |
| 11 | −11.3206 | −11.3206 | 1.5567 | 1.00000 |
| 12 | ∞ | ∞ | 0.6000 | 1.61869 |
| 13 | ∞ | ∞ | 0.0000 | 1.00000 |

The 3rd surface X toroidal surface
The 4th surface X toroidal surface coefficient $\kappa_x = -1.9988E+01$
$A_{y,4} = -1.9289E-03$ The 8th surface aspheric surface coefficient $\kappa = -1.0000E-01$
$A_4 = 1.5011E-04$
$A_6 = 1.0869E-06$ The 10th surface aspheric surface coefficient $\kappa = -5.4726E-01$
$A_4 = 3.7831E-04$
$A_6 = -1.8413E-03$
$A_8 = 6.4043E-04$
$A_{10} = -9.8987E-05$
$A_{12} = -1.1518E-06$
$A_{14} = -7.9320E-07$ Optical path difference function (Coefficient of optical path difference function: reference wavelength 422 nm, diffraction order 8th-order (407 nm))

$C_2 = -7.7249E-04$
$C_4 = -2.0466E-04$
$C_6 = -8.5677E-05$
$C_8 = 2.6999E-05$
$C_{10} = -4.1167E-06$

The 11th surface aspheric surface coefficient $\kappa = -3.3066E+02$
$A_4 = -3.7387E-03$
$A_6 = 8.8025E-03$
$A_8 = -5.2282E-03$
$A_{10} = 1.4815E-03$
$A_{12} = -2.1825E-04$
$A_{14} = 1.3236E-05$

TABLE 11

Example 9 lens data

| | 407 nm | |
|---|---|---|
| | X | Y |
| object point side NA | 0.145 | 0.057 |
| image point side NA | 0.650 | 0.650 |
| wave-front aberration | 0.007 λ | |
| tetraphyllious aberration | 0.005 λ | |
| temperature characteristic | 0.002 λ *1 | |

*1: astigmatism generated at ΔT = +30° C.

| i-th surface | $r_{yi}$ | $r_{xi}$ | $d_i$(407 nm) | $n_i$(407 nm) |
|---|---|---|---|---|
| 0 | | | 0.2513 | |
| 1 | ∞ | ∞ | 0.2500 | 1.52994 |
| 2 | ∞ | ∞ | 1.1853 | 0.00000 |
| 3 | −0.2522 | −520.6418 | 2.0000 | 1.52461 |
| 4 | −2.0865 | −742.0544 | 2.0000 | 1.00000 |
| 5 | ∞ | ∞ | 8.0000 | 1.52994 |
| 6 | ∞ | ∞ | 2.2810 | 1.00000 |
| 7 | 32.4251 | 32.4251 | 2.0000 | 1.52461 |
| 8 | −8.8439 | −8.8439 | 5.0000 | 1.00000 |
| 9 | ∞ | ∞ | 0.0000 | 1.00000 |
| 10 | 1.9327 | 1.9327 | 1.8500 | 1.55981 |
| 11 | −11.3206 | −11.3206 | 1.5567 | 1.00000 |
| 12 | ∞ | ∞ | 0.6000 | 1.61869 |
| 13 | ∞ | ∞ | 0.0000 | 1.00000 |

The 3rd surface X toroidal surface
The 4th surface Y toroidal surface coefficient $\kappa_y = -2.6114E+00$
$A_{y,4} = -3.8307E-02$ The 8th surface aspheric surface coefficient $\kappa = -1.0000E-01$
$A_4 = 1.5303E-04$
$A_6 = 5.6664E-07$ The 10th surface aspheric surface coefficient $\kappa = -5.4726E-01$
$A_4 = 3.7831E-04$
$A_6 = -1.8413E-03$
$A_8 = 6.4043E-04$
$A_{10} = -9.8987E-05$
$A_{12} = -1.1518E-06$
$A_{14} = -7.9320E-07$ Optical path difference function (Coefficient of optical path difference function: reference wavelength 422 nm, diffraction order 8th-order (407 nm))

$C_2 = -7.7249E-04$
$C_4 = -2.0466E-04$
$C_6 = -8.5677E-05$
$C_8 = 2.6999E-05$
$C_{10} = -4.1167E-06$

The 11th surface aspheric surface coefficient $\kappa = -3.3066E+02$
$A_4 = -3.7387E-03$
$A_6 = 8.8025E-03$
$A_8 = -5.2282E-03$
$A_{10} = 1.4815E-03$
$A_{12} = -2.1825E-04$
$A_{14} = 1.3236E-05$

TABLE 12

Example 10 lens data

|  | 407 nm | |
| --- | --- | --- |
|  | X | Y |
| object point side NA | 0.145 | 0.057 |
| image point side NA | 0.650 | 0.650 |
| wave-front aberration | 0.009 λ | |
| tetraphyllious aberration | 0.007 λ | |
| temperature characteristic | −0.001 λ *1 | |

*1: astigmatism generated at ΔT = +30° C.

| i-th surface | $r_{yi}$ | $r_{xi}$ | $d_i$(407 nm) | $n_i$(407 nm) |
| --- | --- | --- | --- | --- |
| 0 |  |  | 0.2513 |  |
| 1 | ∞ | ∞ | 0.2500 | 1.52994 |
| 2 | ∞ | ∞ | 1.1853 | 0.00000 |
| 3 | −0.2530 | −280.0335 | 2.0000 | 1.52461 |
| 4 | −2.0872 | −1013.4197 | 2.0000 | 1.00000 |
| 5 | ∞ | ∞ | 8.0000 | 1.52994 |
| 6 | ∞ | ∞ | 2.2810 | 1.00000 |
| 7 | 32.4251 | 32.4251 | 2.0000 | 1.52461 |
| 8 | −8.8439 | −8.8439 | 5.0000 | 1.00000 |
| 9 | ∞ | ∞ | 0.0000 | 1.00000 |
| 10 | 1.9327 | 1.9327 | 1.8500 | 1.55981 |
| 11 | −11.3206 | −11.3206 | 1.5567 | 1.00000 |
| 12 | ∞ | ∞ | 0.6000 | 1.61869 |
| 13 | ∞ | ∞ | 0.0000 | 1.00000 |

The 3rd surface Y toroidal surface
The 4th surface X toroidal surface coefficient $\kappa_x = -1.9967\text{E}+01$
$A_{x4} = -1.8665\text{E}-03$ The 8th surface aspheric surface coefficient $\kappa = -1.0000\text{E}-01$
$A_4 = 1.4882\text{E}-04$
$A_6 = 1.2613\text{E}-06$ The 10th surface aspheric surface coefficient $\kappa = -5.4726\text{E}-01$
$A_4 = 3.7831\text{E}-04$
$A_6 = -1.8413\text{E}-03$
$A_8 = 6.4043\text{E}-04$
$A_{10} = -9.8987\text{E}-05$
$A_{12} = -1.1518\text{E}-06$
$A_{14} = -7.9320\text{E}-07$ Optical path difference function (Coefficient of optical path difference function: reference wavelength 422 nm, diffraction order 8th-order (407 nm))

$C_2 = -7.7249\text{E}-04$
$C_4 = -2.0466\text{E}-04$
$C_6 = -8.5677\text{E}-05$
$C_8 = 2.6999\text{E}-05$
$C_{10} = -4.1167\text{E}-06$ The 11th surface aspheric surface coefficient $\kappa = -3.3066\text{E}+02$
$A_4 = -3.7387\text{E}-03$
$A_6 = 8.8025\text{E}-03$
$A_8 = -5.2282\text{E}-03$
$A_{10} = 1.4815\text{E}-03$
$A_{12} = -2.1825\text{E}-04$
$A_{14} = 1.3236\text{E}-05$

TABLE 13

Example 11 lens data

|  | 407 nm | |
| --- | --- | --- |
|  | X | Y |
| object point side NA | 0.145 | 0.057 |
| image point side NA | 0.650 | 0.650 |
| wave-front aberration | 0.006 λ | |
| tetraphyllious aberration | 0.005 λ | |
| temperature characteristic | −0.001 λ *1 | |

*1: astigmatism generated at ΔT = +30° C.

| i-th surface | $r_{yi}$ | $r_{xi}$ | $d_i$(407 nm) | $n_i$(407 nm) |
| --- | --- | --- | --- | --- |
| 0 |  |  | 0.2513 |  |
| 1 | ∞ | ∞ | 0.2500 | 1.52994 |
| 2 | ∞ | ∞ | 1.1853 | 0.00000 |
| 3 | −0.2522 | −430.0049 | 2.0000 | 1.52461 |
| 4 | −2.0866 | −620.3211 | 2.0000 | 1.00000 |
| 5 | ∞ | ∞ | 8.0000 | 1.52994 |
| 6 | ∞ | ∞ | 2.2810 | 1.00000 |
| 7 | 32.4251 | 32.4251 | 2.0000 | 1.52461 |
| 8 | −8.8439 | −8.8439 | 5.0000 | 1.00000 |
| 9 | ∞ | ∞ | 0.0000 | 1.00000 |
| 10 | 1.9327 | 1.9327 | 1.8500 | 1.55981 |
| 11 | −11.3206 | −11.3206 | 1.5567 | 1.00000 |
| 12 | ∞ | ∞ | 0.6000 | 1.61869 |
| 13 | ∞ | ∞ | 0.0000 | 1.00000 |

The 3rd surface Y toroidal surface
The 4th surface Y toroidal surface coefficient $\kappa_y = -1.0031\text{E}+00$
$A_{y4} = -1.7374\text{E}-02$ The 8th surface aspheric surface coefficient $\kappa = -1.0000\text{E}-01$
$A_4 = 1.5493\text{E}-04$
$A_6 = 3.0252\text{E}-07$ The 10th surface aspheric surface coefficient $\kappa = -5.4726\text{E}-01$
$A_4 = 3.7831\text{E}-04$
$A_6 = -1.8413\text{E}-03$
$A_8 = 6.4043\text{E}-04$
$A_{10} = -9.8987\text{E}-05$
$A_{12} = -1.1518\text{E}-06$
$A_{14} = -7.9320\text{E}-07$ Optical path difference function (Coefficient of optical path difference function: reference wavelength 422 nm, diffraction order 8th-order (407 nm))

$C_2 = -7.7249\text{E}-04$
$C_4 = -2.0466\text{E}-04$
$C_6 = -8.5677\text{E}-05$
$C_8 = 2.6999\text{E}-05$
$C_{10} = -4.1167\text{E}-06$ The 11th surface aspheric surface coefficient $\kappa = -3.3066\text{E}+02$
$A_4 = -3.7387\text{E}-03$
$A_6 = 8.8025\text{E}-03$
$A_8 = -5.2282\text{E}-03$
$A_{10} = 1.4815\text{E}-03$
$A_{12} = -2.1825\text{E}-04$
$A_{14} = 1.3236\text{E}-05$ $$(Z - R_y)^2 + Y^2 = \left( R_y - \frac{X^2}{R_x \left(1 + \sqrt{1 - (1+\kappa_x)X^2/R_x^2}\right)} + \sum A_{xi} X^i \right) \qquad \text{[Math-2]}$$

-continued $$(Z - R_y)^2 + Y^2 = \left(R_y - \frac{X^2}{\left(1 + \sqrt{1 - X^2/R_x^2}\right)}\right) \quad [\text{Math-4}]$$

Herein, Z is a direction in the optical axis L direction (an advancing direction of the light is positive), X, Y are a distance (height from the optical axis) in X, Y direction, $R_x$ is a paraxial radius of curvature on XZ surface, $R_y$ is a paraxial radius of curvature on YZ surface, and $\kappa_x$ and $A_{xi}$ are non-circular arc coefficients.

Further, in each of Examples, the outgoing surface (the 8th surface) of the coupling lens, the incident surface (the 10th surface) and the outgoing surface (the 11th surface) of the objective lens are formed into the aspheric surface axial symmetric around the optical axis L, which is regulated by an equation in which coefficients in Tables 9-13 are substituted into the Math-5.

Further, on the incident surface (the 10th surface) of the objective lens, furthermore, the diffraction ring-shaped zone around the optical axis is formed, and the pitch of the diffraction ring-shaped zone is regulated by an equation in which coefficients shown in Tables 9-13 are substituted into the optical path difference function of Math-6.

As shown in Tables 9-13, in the structure of Examples 7-13, the temperature characteristic (the astigmatism amount generated at the time of temperature rise of 30° C.) is within the range from −0.002 λrms to 0.000 λrms, it can be seen that the astigmatism at the temperature change is sufficiently suppressed, however, as in Example 7, a value of the tetraphyllous aberration (4thAS) when both of the incident surface and outgoing surface of the beam-shper are structured by the cylindrical surface is 0.009 λrms, in contrast to this, as in Examples 8-11, a value of the tetraphyllous aberration (4thAS) when both of the incident surface and outgoing surface are structured by the toroidal surface is a value not larger than 0.007 λrms.

As described above, as in Example 7, when both surfaces of the plastic-made beam-shaper are structured by the cylindrical surface, the astigmatism at the time of temperature change can be suppressed to the degree of practically no-hindrance, however, it can be seen that, as in Examples 8-11, when the optical surface of the beam-szhaper are structured by the toroidal surface, not only the astigmatism at the time of temperature change, but also the suppression of the remained aberration (4thAS (tetraphylluos aberration)) becomes possible, and the better optical characteristic can be obtained.

EFFECT OF THE INVENTION

According to the present invention, a plastic-made beam shaping lens, light source apparatus and an optical pick-up apparatus, by which a divergent beam whose cross sectional shape is an almost circle, can be projected while the generation of the astigmatism following a change of the environmental temperature is suppressed, are obtained.

The invention claimed is:
1. A light source apparatus comprising:
 a light source by which a light flux whose emitting angle is different in a horizontal direction and in a vertical direction is projected, and
 a beam shaping element, for converting the light flux into a light flux whose emitting angle is almost equal in both the horizontal direction and the vertical direction and projecting, of a single lens formed of plastic in which a linear expansion coefficient $\alpha_n$ satisfies the following expression (1)

$$5.0 \times 10^{-5} < \alpha_n < 8.0 \times 10^{-5} \quad (1), \text{ and}$$

a part of the beam shaping element is fixed and arranged to the light source, so that an astigmatism generated following the refractive index change of the beam shaping element generated by a temperature change is suppressed by an interval change, which is generated by the linear expansion of the beam shaping element, between the light source and the incident surface of the beam shaping element, wherein, in the beam shaping element, an outgoing surface is fixed so that a distance in the optical axis direction from the beam shaping element to the light source is almost constant in a range of the temperature change, wherein the beam shaping element is structured so that the astigmatism generated by the temperature change is suppressed by using the astigmatism generated following a shape change due to the temperature change of the beam shaping element, wherein a fixing member for fixing the beam shaping element outgoing surface is formed of a material having a linear expansion coefficient satisfying $10 \times 10^{-5} < \alpha_n < 3.0 \times 10^{-5}$, wherein, in the beam shaping element, a cross sectional shape in the horizontal direction or in the vertical direction of at least one optical surface of the incident surface and the outgoing surface is a non-circular arc, wherein the surface shape of the beam shaping element incident surface satisfies the following Math-1 or Math-2, $$(Z - R_x)^2 + X^2 = \left(R_x - \frac{Y^2}{R_y\left(1 + \sqrt{1 - (1+k_y)Y^2/R_y^2}\right)} + \sum_i A_{yi} Y^i\right)^2 \quad [\text{Math-1}]$$

$$(Z - R_y)^2 + Y^2 = \left(R_y - \frac{X^2}{R_x\left(1 + \sqrt{1 - (1+k_x)X^2/R_x^2}\right)} + \sum A_{xi} X^i\right) \quad [\text{Math-2}]$$

wherein: Z is a distance in a Z-axis direction, Z corresponds to the optical axis direction, and Z is positive in an advancing direction of the light emitted by the light source, X and Y are distances in an X-axis direction, which corresponds to the horizontal direction, and a Y-axis direction, which corresponds to the vertical direction, the X and Y distances indicate a height from the optical axis in each of the X- and Y-axes, $R_x$ is a paraxial radius of curvature on the XZ surface, $R_y$ is a paraxial radius of curvature on YZ surface, and $k_x$, $k_y$, $A_{xi}$, and $A_{yi}$ are non circular arc coefficients.

2. A light source apparatus of claim 1,
wherein the surface shape of the beam shaping element outgoing surface satisfies the following Math-3 or Math-4, $$(Z - R_x)^2 + X^2 = \left(R_x - \frac{Y^2}{\left(1 + \sqrt{1 - Y^2/R_y^2}\right)}\right) \quad [\text{Math-3}]$$

-continued $$(Z - R_y)^2 + Y^2 = \left(R_y - \frac{X^2}{\left(1 + \sqrt{1 - X^2/R_x^2}\right)}\right).$$  [Math-4]

3. An optical pick-up apparatus comprising:
the light source apparatus of claim 2, and
a light converging element for converging the light flux on an information recording surface of an optical information recording medium, and reproducing and recording of information is conducted on the optical information recording medium.

4. An optical pick-up apparatus of claim 3, further comprising:
a divergent angle converting element for converting a divergent angle of the light flux projected from the beam shaping element outgoing surface,
wherein the optical pick-up apparatus is structured so as to satisfy the following relational expression, $$0.5 < (L/S) \times fc < 1.0$$

wherein
L is thickness on axis (mm) of the beam shaping element,
S is distance (mm) on the optical axis between light source and the beam shaping element incident surface, and
fc is focal distance (mm) of the divergent angle converting element.

5. An optical pick-up apparatus of claim 4,
wherein the divergent angle converting element is a coupling lens for converting the light flux projected from the beam shaping element into a parallel light parallel to the optical axis.

6. A light source apparatus comprising:
a light source by which a light flux whose emitting angle is different in a horizontal direction and in a vertical direction is projected, and
a beam shaping element, for converting the light flux into a light flux whose emitting angle is almost equal in both the horizontal direction and the vertical direction and projecting of a single lens formed of plastic in which a linear expansion coefficient $\alpha_n$ satisfies the following expression (1)

$$5.0 \times 10^{-5} < \alpha_n < 8.0 \times 10^{-5} \quad (1), \text{ and}$$

a part of the beam shaping element is fixed and arranged to the light source, so that an astigmatism generated following the refractive index change of the beam shaping element generated by a temperature change is suppressed by an interval change, which is generated by the linear expansion of the beam shaping element, between the light source and the incident surface of the beam shaping element,
wherein the surface shape of the beam shaping element outgoing surface satisfies the following Math-1 or Math-2, $$(Z - R_x)^2 + X^2 = \left(R_x - \frac{Y^2}{R_y\left(1 + \sqrt{\frac{1 - (1 + k_y)Y^2}{R_y^2}}\right)} + \sum_i A_{yi} Y^i\right)^2$$  [Math-1]

-continued $$(Z - R_y)^2 + Y^2 = \left(R_y - \frac{X^2}{R_x\left(1 + \sqrt{\frac{1 - (1 + k_x)X^2}{R_x^2}}\right)} + \sum A_{xi} X^i\right)$$  [Math-2]

wherein: Z is a distance in a Z-axis direction, corresponds to the optical axis direction, and is positive in an advancing direction of the light emitted by the light source, X and Y are distances in an X-axis direction, which corresponds to the horizontal direction, and a Y-axis direction, which corresponds to the vertical direction, the X and Y distances indicate a height from the optical axis in each of the X- and Y-axes, $R_x$ is a paraxial radius of curvature on the XZ surface, $R_y$ is a paraxial radius of curvature on YZ surface, and $k_x$, $k_y$, $A_{xi}$, and $A_{yi}$ are noncircular arc coefficients.

7. A light source apparatus of claim 6,
wherein the surface shape of the beam shaping element incident surface satisfies the following Math-3 or Math-4, $$(Z - R_x)^2 + X^2 = \left(R_x - \frac{Y^2}{\left(1 + \sqrt{1 - Y^2/R_y^2}\right)}\right)$$  [Math-3]

$$(Z - R_y)^2 + Y^2 = \left(R_y - \frac{X^2}{\left(1 + \sqrt{1 - X^2/R_x^2}\right)}\right).$$  [Math-4]

8. An optical pick-up apparatus comprising:
the light source apparatus of claim 7 and a light converging element for converging the light flux on an information recording surface of an optical information recording medium, and reproducing and recording of information is conducted on the optical information recording medium.

9. An optical pick-up apparatus of claim 8, further comprising:
a divergent angle converting element for converting a divergent angle of the light flux projected from the beam shaping element outgoing surface,
wherein the optical pick-up apparatus is structured so as to satisfy the following relational expression, $$1.5 < (L/S) \times fc < 1.0$$

wherein,
L is thickness on axis (mm) of the beam shaping element,
S is distance (mm) on the optical axis between light source and the beam shaping element incident surface, and
fc is focal distance (mm) of the divergent angle converting element.

10. An optical pick-up apparatus of claim 9,
wherein the divergent angle converting element is a coupling lens for converting the light flux projected from the beam shaping element into a parallel light parallel to the optical axis.

11. A light source apparatus comprising:
a light source by which a light flux whose emitting angle is different in a horizontal direction and in a vertical direction is projected, and
a beam shaping element, for converting the light flux into a light flux whose emitting angle is almost equal in both the horizontal direction and the vertical direction and projecting of a single lens formed of plastic in which a linear expansion coefficient $\alpha_n$ satisfies the following expression (1)

$$5.0 \times 10^{-5} < \alpha_n < 8.0 \times 10^{-5} \qquad (1), \text{ and}$$

a part of the beam shaping element is fixed and arranged to the light source, so that an astigmatism generated following the refractive index change of the beam shaping element generated by a temperature change is suppressed by an interval change, which is generated by the linear expansion of the beam shaping element, between the light source and the incident surface of the beam shaping element, wherein, in the beam shaping element, a cross sectional shape in the horizontal direction or in the vertical direction of the least one optical surface of the incident surface and the outgoing surface is a non-circular arc, wherein the surface shape of the beam shaping element incident surface satisfies the following Math-1 or Math-2, $$(Z-R_x)^2 + X^2 = \left( R_x - \frac{Y^2}{R_y\left(1+\sqrt{\frac{1-(1+k_y)Y^2}{R_y^2}}\right)} + \sum_i A_{yi}Y^i \right)^2 \qquad [\text{Math-1}]$$

$$(Z-R_y)^2 + Y^2 = \left( R_y - \frac{X^2}{R_x\left(1+\sqrt{\frac{1-(1+k_x)X^2}{R_x^2}}\right)} + \sum_i A_{xi}X^i \right)^2 \qquad [\text{Math-2}]$$

wherein: Z is a distance in a Z-axis direction, corresponds to the optical axis direction, and is positive in an advancing direction of the light emitted by the light source, X and Y are distances in an X-axis direction, which corresponds to the horizontal direction, and a Y-axis direction, which corresponds to the vertical direction, the X and Y distances indicate a height from the optical axis in each of the X- and Y-axes, $R_x$ is a paraxial radius of curvature on the XZ surface, $R_y$ is a paraxial radius of curvature on YZ surface, and $k_x$, $k_y$, $A_{xi}$, and $A_{yi}$ are non circular arc coefficients.

12. A light source apparatus of claim 11, wherein the surface shape of the beam shaping element outgoing surface satisfies the following Math-3 or Math-4, $$(Z-R_x)^2 + X^2 = \left( R_x - \frac{Y^2}{\left(1+\sqrt{1-Y^2/R_y^2}\right)} \right) \qquad [\text{Math-3}]$$

$$(Z-R_y)^2 + Y^2 = \left( R_y - \frac{X^2}{\left(1+\sqrt{1-X^2/R_x^2}\right)} \right). \qquad [\text{Math-4}]$$

13. A light source apparatus comprising:

a light source by which a light flux whose emitting angle is different in a horizontal direction and in a vertical direction is projected, and a beam shaping element, for converting the light flux into a light flux whose emitting angle is almost equal in both the horizontal direction and the vertical direction and projecting of a single lens formed of plastic in which a linear expansion coefficient $\alpha_n$ satisfies the following expression (1)

$$5.0 \times 10^{-5} \alpha_n < 8.0 \times 10^{-5} \qquad (1), \text{ and}$$

a part of the beam shaping element is fixed and arranged to the light source, so that an astigmatism generated following the refractive index change of the beam shaping element generated by a temperature change is suppressed by an interval change, which is generated by the linear expansion of the beam shaping element, between the light source and the incident surface of the beam shaping element, wherein, in the beam shaping element, a cross sectional shape in the horizontal direction or in the vertical direction of at least one optical surface of the incident surface and the outgoing surface is a non-circular arc, wherein the surface shape of the beam shaping element outgoing surface satisfies the following Math-1 or Math-2, $$(Z-R_x)^2 + X^2 = \left( R_x - \frac{Y^2}{R_y\left(1+\sqrt{\frac{1-(1+k_y)Y^2}{R_y^2}}\right)} + \sum_i A_{yi}Y^i \right)^2 \qquad [\text{Math-1}]$$

$$(Z-R_y)^2 + Y^2 = \left( R_y - \frac{X^2}{R_x\left(1+\sqrt{\frac{1-(1+k_x)X^2}{R_x^2}}\right)} + \sum_i A_{xi}X^i \right)^2 \qquad [\text{Math-2}]$$

wherein: Z is a distance in a Z-axis direction, corresponds to the optical axis direction, and is positive in an advancing direction of the light emitted by the light source, X and Y are distances in an X-axis direction, which corresponds to the horizontal direction, and a Y-axis direction, which corresponds to the vertical direction, the X and Y distances indicate a height from the optical axis in each of the X- and Y-axes, $R_x$ is a paraxial radius of curvature on the XZ surface, $R_y$ is a paraxial radius of curvature on YZ surface, and $k_x$, $k_y$, $A_{xi}$ and $A_{yi}$ are non circular arc coefficients.

14. A light source apparatus of claim 13, wherein the surface shape of the beam shaping element incident surface satisfies the following Math-3 or Math-4, $$(Z-R_x)^2 + X^2 = \left( R_x - \frac{Y^2}{\left(1+\sqrt{1-Y^2/R_y^2}\right)} \right) \qquad [\text{Math-3}]$$

$$(Z-R_y)^2 + Y^2 = \left( R_y - \frac{X^2}{\left(1+\sqrt{1-X^2/R_x^2}\right)} \right). \qquad [\text{Math-4}]$$

15. An optical pick-up apparatus comprising:

a light source apparatus comprising:

a light source by which a light flux whose emitting angle is different in a horizontal direction and in a vertical direction is projected, and a beam shaping element, for converting the light flux into a light flux whose emitting angle is almost equal in both the horizontal direction and the vertical direction and projecting, of a single lens formed of plastic in which a linear expansion coefficient $\alpha_n$ satisfies the following expression (1)

$$5.0\times10^{-5}<\alpha_n<8.0\times10^{-5} \qquad (1),\text{ and}$$

a part of the beam shaping element is fixed and arranged to the light source, so that an astigmatism generated following the refractive index change of the beam shaping element generated by a temperature change is suppressed by an interval change, which is generated by the linear expansion of the beam shaping element, between the light source and the incident surface of the beam shaping element, and a light converging element for converging the light flux on an information recording surface of an optical information recording medium, and the reproducing and/or recording of the information is conducted on the optical information recording medium, and further comprising:

a divergent angle converting element for converting a divergent angle of the light flux projected from the beam shaping element outgoing surface, wherein the optical pick-up apparatus is structured so as to satisfy the following relational expression, $$3.5<(L/S)\times fc<1.0$$

wherein,

L is thickness on axis (mm) of the beam shaping element,

S is distance (mm) on the optical axis between the light source and the beam shaping element incident surface, and fc is focal distance (mm) of the divergent angle converting element.

16. An optical pick-up apparatus of claim 15, wherein the divergent angle converting element is a coupling lens for converting the light flux projected from the beam shaping element into a parallel light parallel to the optical axis.

* * * * *